US012506636B2

(12) United States Patent
Bentley et al.

(10) Patent No.: US 12,506,636 B2
(45) Date of Patent: Dec. 23, 2025

(54) APPLIANCE MANAGEMENT SYSTEM

(71) Applicants: BSH Home Appliances Corporation, Irvine, CA (US); BSH Hausgeräte GmbH, Munich (DE)

(72) Inventors: Garrett Bentley, Knoxville, TN (US); Luc Lam, Irvine, CA (US)

(73) Assignees: BSH Home Appliances Corporation, Irvine, CA (US); BSH Hausgeräte GmbH, Munich (DE)

(*) Notice: Subject to any disclaimer, the term of this patent is extended or adjusted under 35 U.S.C. 154(b) by 560 days.

(21) Appl. No.: 17/980,606

(22) Filed: Nov. 4, 2022

(65) Prior Publication Data
US 2024/0154839 A1 May 9, 2024

(51) Int. Cl.
*H04L 12/28* (2006.01)
*A21B 1/00* (2006.01)

(52) U.S. Cl.
CPC .......... *H04L 12/2827* (2013.01); *A21B 1/00* (2013.01); *H04L 12/2825* (2013.01); *H04L 2012/285* (2013.01)

(58) Field of Classification Search
CPC .......... H04L 12/2827; H04L 12/2825; H04L 2012/285; A21B 1/00; F24C 7/085
USPC ............................................ 700/90
See application file for complete search history.

(56) References Cited

U.S. PATENT DOCUMENTS

| 8,990,274 | B1 | 3/2015 | Hwang | |
|---|---|---|---|---|
| 10,650,333 | B2 | 5/2020 | Weiss | |
| 10,820,750 | B2* | 11/2020 | Chin | A47J 37/0647 |
| 2002/0075160 | A1* | 6/2002 | Racz | G08C 17/00 340/5.74 |
| 2008/0105673 | A1* | 5/2008 | Ikeda | H05B 6/6426 219/714 |
| 2014/0297348 | A1 | 10/2014 | Ellis | |
| 2016/0359325 | A1* | 12/2016 | Kawata | H04L 12/2829 |
| 2017/0011649 | A1 | 1/2017 | Lee | |
| 2018/0247253 | A1* | 8/2018 | Duquene | H04L 9/3247 |

(Continued)

FOREIGN PATENT DOCUMENTS

| CN | 108729109 A | * | 11/2018 | ............ D06F 33/00 |
|---|---|---|---|---|
| CN | 110207178 A | * | 9/2019 | |
| CN | 112227000 A | * | 1/2021 | |

(Continued)

*Primary Examiner* — Thomas C Lee
*Assistant Examiner* — Michael Tang
(74) *Attorney, Agent, or Firm* — Michael E. Tschupp; Andre Pallapies; Brandon G. Braun

(57) ABSTRACT

An appliance management system for facilitating the dispersal of parts of a chore among users may include an appliance configured to be controlled at least partially automatically according to a routine created by a primary user, who will be away from the appliance (e.g., out of the house) during at least part of the time the routine is being carried out. The routine includes at least one task to be performed by a secondary user, who is in the same general location as the appliance. The task comprises at least one action that cannot practically be performed remotely. Remote control of the appliance is assigned to the primary user in response to the task being completed. Accordingly, the secondary user performs a task that the remote primary user cannot practically perform, but has little or no input into other parts of the chore.

20 Claims, 12 Drawing Sheets

(56) References Cited

U.S. PATENT DOCUMENTS

2019/0162418 A1    5/2019  Egenter
2025/0127328 A1*   4/2025  Sevadjian ........... A47J 37/0682

FOREIGN PATENT DOCUMENTS

| | | | | |
|---|---|---|---|---|
| CN | 113142981 A | * | 7/2021 | .............. A47J 27/00 |
| JP | 2005176617 A | | 7/2005 | |
| JP | 2006209317 A | | 8/2006 | |
| JP | 2020031438 A | * | 2/2020 | .............. E05F 15/43 |
| JP | 2021177467 A | * | 11/2021 | |

\* cited by examiner

APPLIANCE MANAGEMENT SYSTEM

FIELD

This disclosure relates to systems and methods for controlling an appliance. More specifically, the disclosed examples relate to managing use of an appliance via remote and local control.

INTRODUCTION

It is common, in typical households, for a primary member to find themselves burdened with a majority if not all of the chores and tasks around the house, such as cooking, cleaning, and laundry, because other members of the household may be unwilling or unable to help. For example, many households have a designated primary cook who is relied on to prepare food for the entire household. While it's possible that the primary cook may be a stay-at-home parent or individual, it is often the case that the primary cook may also have a job outside the home. For those individuals who are not only their household's primary cook but also hold jobs outside the home, meal planning and preparation can often be a stressful burden and a major source of tension within the household.

This burden and stress that falls on the primary cook can be at least partially alleviated if other members of the household participate in or assist the primary cook in meal preparation. However, these other members of the household may not be willing, able, or sufficiently skilled to assist the primary cook or prepare meals on their own. For example, children, teenagers, and/or adults who cook infrequently may not know how to cook a dish or operate a cooking appliance, and/or may be overwhelmed by the process.

SUMMARY

The present disclosure provides systems, apparatuses, and methods relating to appliance management systems.

In some examples, a method for processing a food product comprises receiving, at processing logic of an appliance disposed at a first location, an indication that a desired action has been taken at the appliance; and in response to receiving the indication: automatically, by the processing logic of the appliance, controlling the appliance to process the food product in accordance with a first stage of a processing program; and automatically disabling a manual control of the appliance, such that the manual control is inoperable to modify the processing of the food product in accordance with the first stage of the processing program.

In some examples, a system for preparing a food product comprises an electronic controller configured to control an appliance to prepare a food product based on a preparation program stored in a memory coupled to the electronic controller, the preparation program including at least a first step associated with a first action to be manually performed at the appliance; an indicator in communication with the electronic controller and configured to alert an onsite user to manually perform the first action at the appliance; wherein the electronic controller is configured to: based on the preparation program, prompt the onsite user via the indicator to manually perform the first action; and in response to determining that the first action has been performed, control one or more parameters of the appliance to initiate a second step of the preparation program, and transition the appliance to a remotely controllable state in which a user interface of the appliance is prevented from adjusting the one or more parameters of the appliance except to turn off one or more operating elements of the appliance.

In some examples, a method for facilitating remote management of food processing comprises: at a predetermined time, automatically notifying an onsite user to perform a first manual task at an appliance; and in response to an indication that the first manual task has been performed: automatically control the appliance to process a food item; and automatically transition the appliance to a remotely controllable state wherein the appliance is unresponsive to input via any user interface of the appliance except a safety shutoff.

Features, functions, and advantages may be achieved independently in various embodiments of the present disclosure, or may be combined in yet other embodiments, further details of which can be seen with reference to the following description and drawings.

DETAILED DESCRIPTION

Figure 1:
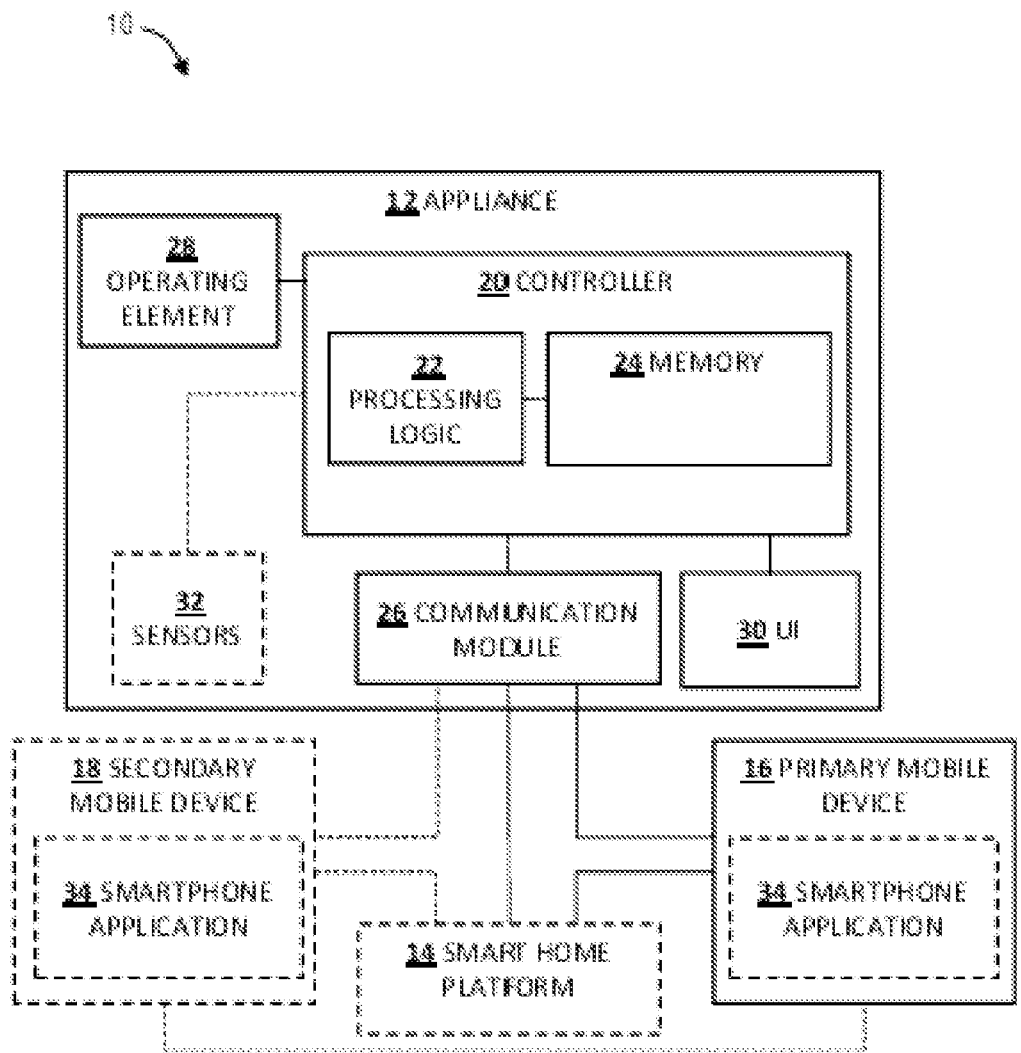
FIG. 1 is a schematic diagram of an illustrative appliance management system in accordance with aspects of the present disclosure.

Various aspects and examples of an appliance management system, as well as related systems and methods, are described below and illustrated in the associated drawings. Unless otherwise specified, an appliance management system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, appliance management systems of the present disclosure facilitate a primary user enlisting assistance from one or more non-primary (AKA secondary) users within a household to perform a chore (e.g., meal preparation, laundry, and/or any other suitable chore). A management system includes at least one appliance to be used in a chore (e.g., an oven to be used to cook food) desired by a primary user, who is typically located remote from the appliance, and one or more secondary users, who are in the same general location as the appliance. The management system is configured to allow the primary user to pre-program and/or remotely control a significant portion of the task, such that the secondary user is responsible for only (or little more than) those parts of the task that require or greatly benefit from an onsite user. After the secondary user's task is completed, the system transfers control of the appliance to the primary user (e.g., by disabling one or more manual controls and enabling the appliance to be remotely controlled by the primary user).

In certain illustrative examples described herein, the appliance comprises an oven; however, in general, any suitable appliance or appliance(s) may be used in conjunction with the management system of the present teachings.

As an example, the primary user may be a parent who is at work or running errands, and the secondary user(s) may be a teenager who is at home, and the chore to be performed may be cooking a food item in an oven. The management system is configured to allow the primary user to select and/or create a cooking routine to be carried out automatically or semiautomatically by the oven and secondary user (s). The cooking routine includes at least one step that is carried out automatically by the oven and/or controlled remotely by the primary user (e.g., via an app), and at least one step in which the system automatically notifies the secondary user that they should take an action (e.g., putting food into an oven; removing a tray from an oven, stirring food on the tray, and putting the tray back in the oven; etc.). For example, the cooking routine may include automatically preheating the oven to a predetermined temperature, automatically notifying the secondary user that they should insert food into the oven, and, after the food has been inserted into the oven, automatically performing a cooking function (e.g., heating the oven to a particular temperature) and transferring control to the primary user. Transferring control to the primary user generally includes enabling the oven to receive instructions from a mobile device or other computing system operated by the remote user, and may include disabling some or all of the manual controls of the oven, such that the secondary user cannot directly control the oven operation via an interface of the oven. In some examples, one or more safety controls (e.g., a power switch, gas supply switch, etc.) remains operable even when other manual controls are disabled, so that the oven can be shut off for safety purposes.

The management system comprises an appliance (e.g., an oven) including and/or coupled to processing logic and configured to be controlled according to a control routine executed at least in part by the processing logic. The appliance and processing logic are configured at least to be programmed by the primary user (e.g., by receiving from the primary user a selection of a cooking program and/or one or more cooking parameters), to cause the secondary user to be notified to take action, and to operate according to the control routine and/or remote control by the primary user after the action has been taken.

In some examples, the system further comprises one or more connected (e.g., networked) devices such as a mobile phone, a smart appliance (e.g., "smart oven"), and/or smart home assistants and/or platforms (e.g., a Google home system or Amazon Alexa system). For example, aspects of a smart home platform may be used to identify secondary users who are at home and available to take action, to notify secondary user(s) when it is time to take action, and/or to perform any other suitable function(s).

In some examples, the management system may include an oven configured to connect to mobile devices, computers, a home network, and/or any other suitable devices. In such an example, a processing logic of the oven and/or other part of the management system displays and/or cue alerts via an interface of the oven or another appliance, send notifications to connected devices (e.g., mobile devices, computer, etc.) of other members in a household, and/or perform any other suitable action to prompt a person who is at home to help with preparation of a meal, thus dispersing some workload from the primary member to the secondary member(s). Helping to prepare the meal can include using one or more devices other than the appliance of the management system, such as a cooktop, range, microwave, combination cooker (i.e., combi-oven), countertop cooking appliance (e.g., slow cooker, Instant Pot cooker and/or other combination cooker), a combination of any of these devices, and/or any other method of preparing food.

In some examples, to prepare a meal using the management system, the primary user may plan and/or partially prepare a meal ahead of time and create a cooking routine by specifying a selected or created meal cooking program, scheduling parameters (e.g., desired starting or finishing time, etc.) and/or action parameters (e.g., information relating to an action to be taken by an onsite secondary user, such as an instruction to be displayed to the onsite user, an instruction to processing logic of the appliance to start a step of the cooking program in response to an indication that the meal has been loaded into oven and the oven door is closed, etc.), and in some cases a selection of one or more secondary user(s) within the household who will receive alerts and/or notifications from the management system. The meal cooking program comprises at least one meal-preparation step to be performed automatically by the appliance (e.g., automatically heating a cooking chamber at a predetermined temperature for a predetermined time interval). In some cases, the cooking program is created by the primary user inputting cooking parameters (e.g., generic cooking mode such as bake or broil, temperature, and time). Alternatively, or additionally, the cooking program may be selected by the primary user (e.g., via an interface of the appliance and/or a software application on a computing device in communication with the appliance) from a list of existing meal cooking programs. Each of the existing meal cooking programs is associated with information comprising one or more of a plurality of factors such as estimated cooking time, appropriate cooking modes and temperatures, and/or other information relating to the preparation and cooking of a food item associated with the program.

The scheduling and/or action parameters specified by the primary user may indicate to the oven or other appliance to begin executing the cooking routine or steps of the cooking routine at a desired time and/or in response to an action. In some examples, the primary user may select scheduling parameters such as a desired starting or finishing time for the meal to begin or finish cooking. In some examples, the primary user may additionally or alternatively specify an acceptable buffer period, e.g., a period of time before or after the desired starting (or finishing) time during which it is acceptable for the cooking routine to begin (or finish). In some examples, the primary user may additionally or alternatively specify an earliest and/or latest allowed start time for the cooking routine. For example, the primary user may specify that a particular step in the routine (e.g., automatically preheating an oven, notifying a secondary user to insert food into an oven, and/or commencing a particular step in an automated cooking program) should begin at a specified time, no earlier than or no later than a specified time, or within a certain window. Additionally, or alternatively, the primary user may specify that the preparation process should end at a particular time, no earlier than or no later than a particular time, or within a certain window of time.

In general, the cooking routine includes at least one task (e.g., putting food into an oven; removing a tray from an oven, stirring food on the tray, and putting the tray back in the oven; etc.) to be performed and/or completed by a secondary user at a particular point(s) during the cooking routine. In general, the task performed by the secondary user is a task that can only be performed by someone who is physically present at the appliance at the appropriate time (e.g., because the task is difficult, impractical, and/or impossible to perform remotely, and/or because the food preparation would fail or yield poor results if the task were performed at a different point in the process). In some examples, the secondary user is notified that they should perform the task by a human-perceptible indication from the appliance (e.g., a light and/or noise produced by the appliance and/or one or more other devices coupled to the appliance). Additionally, or alternatively, one or more specific secondary user(s) may be selected (e.g., by input from the primary user, and/or on any other suitable basis) to receive an alert and/or notification from the system to perform the task (e.g., via a message on a mobile digital device of the selected secondary user).

In some examples, the oven or other appliance receives a cooking routine as input from the primary user, the cooking routine including information relating to the timing and/or operating methods of a preparation process to be executed by the oven during the cooking routine. The processing logic of the oven may further determine a total cook time of the routine (e.g., a total time of the automated cooking program of the routine), and/or determine an estimated completion time of task(s) (e.g., task(s) performed by the secondary user) included in the received routine. Additionally or alternatively, the processing logic of the oven may determine an estimated total time of routine (i.e., a sum of the total cook time and the estimated completion time of task(s)), and/or determine whether any additional intermediate steps (e.g., not already specified by the primary user) should be taken by the secondary user before the cooking routine is completed.

In some examples, (e.g., when the earliest and/or latest allowed start times are not specified by the primary user), the processing logic of the oven or other appliance is configured to determine the earliest and/or latest allowed start times for a given part of the process based on scheduling parameter(s) received from the primary user, a predicted total cook time, an estimated total time of the process, and/or any other suitable factor(s). As an example, the processing logic of the oven may be configured to determine the earliest and latest allowed start times for the entire preparation process based on a desired starting or finishing time for the meal and an acceptable buffer period (e.g., a period selected by the primary user and/or a default period). As another example, the processing logic of the oven may be configured to determine the latest allowed start time for the cooking routine based on a desired finishing time for the meal and an earliest allowed start time.

For example, a primary user may specify that the appliance will execute a cooking program having a total cook time of 45 minutes and that the meal should be finished at 6 PM or no more than 15 minutes earlier than 6 PM (e.g., that there is an acceptable buffer period of 15 minutes). In response to these specifications, the processing logic of the oven may determine an earliest allowed start time of 5 PM and a latest allowed start time of 5:15 PM.

The processing logic of the appliance may be configured to communicate with one or more sensors to monitor one or more aspects of the appliance, an environment of the appliance, and/or aspects of the management system before, during, and/or after the scheduled routine. For example, processing logic of the oven may be configured to monitor (e.g., using an internal clock and/or by communicating with an external computing system) the current time of day and compare it to the earliest and latest allowed start times to determine whether to initiate, pause, or terminate a scheduled cooking routine or cooking program of the scheduled routine. In some examples, processing logic of the oven is configured to monitor time of day until the current time of day is the earliest allowed start time or is after the earliest allowed start time. In some examples, the processing logic of the oven is configured to initiate or continue with a next step of the preparation process of the scheduled cooking routine in response to observing that the current time of day is between the earliest allowed start time and the latest allowed start time. In some examples, the processing logic of the oven is configured to pause or terminate the scheduled cooking routine and/or meal cooking program in response to observing that the current time of day is past the latest allowed start time and an initial task(s) has not been completed.

The oven (or other appliance) may further be configured to communicate with one or more sensors and/or connected devices to determine the presence of users within and/or in vicinity of the household. In some examples, the processing logic of the oven and/or other appliances is configured to communicate with the one or more sensors and/or connected devices to determine whether any of the selected secondary users are at home, in response to receiving a signal and/or data indicating that the current time of day is the earliest allowed start time. In some examples, the processing logic of the oven and/or other appliances is configured to communicate with connected devices that monitor a home network and may detect and identify which user(s) has entered the house or is in the house by detecting a connection of a user's mobile device to the home network. In some examples, the oven is a smart appliance configured to communicate with other smart devices in the household such as connected smart switches, doors, and/or any other systems that may detect a user entering or exiting the household, to detect activity in the household. In some examples, the oven is further configured to communicate with the smart home platform to identify which of one or more present secondary users are available to perform and/or complete a task, based on collected data such as a Google calendar, etc.

In some examples, the processing logic of the oven is configured to begin a next step of the scheduled cooking routine in response receiving a signal and/or data identifying that a selected secondary user is in the house. For example, the processing logic of the oven may be configured to begin preheating the oven in response receiving a signal and/or data identifying that a selected secondary user is in the house.

In some examples, the processing logic of the oven and/or other appliances is further configured to communicate with one or more monitoring devices (e.g., sensors, cameras, etc.) to monitor the progress of one or more cooking program steps and/or user-performable task(s) of the process of a scheduled routine. In some examples, the processing logic of the oven and/or other appliances is configured to automatically sense or confirm the completion of task(s) by the selected secondary user by communicating with sensors (e.g., cameras) disposed within and/or around the oven. For example, the processing logic may be configured to receive data from a mechanical component or switch such as a door switch indicating that a lid and/or door of the appliance has been opened or shut. In some examples, the processing logic of the oven is configured to receive from a user device and/or oven interface a confirmation signal input by the secondary user to confirm the completion of the task(s).

In general, the processing logic of the appliance, and/or one or more computing devices in communication with the appliance, is configured to send notification(s) to the primary user (and optionally a secondary user) relating to the status of the one or more steps and/or tasks of the scheduled routine. For example, a notification may inform the primary user that it is time for the secondary user perform a manual task at the appliance, that the secondary user has performed the task, and/or that the secondary user has not performed the task in a time window in which they were expected to do so. In some examples, a notification informs the primary user that an autonomous cooking program of the cooking routine has begun or finished, and/or that a particular step(s) of the program has begun or finished.

In some examples, the processing logic of the oven is configured to communicate with a monitoring device (e.g., a temperature sensor) to monitor a preheating step of a scheduled cooking routine and display and/or transmit a notification to a secondary user instructing them to place components of a meal into a preheated oven, in response to receiving a signal and/or data indicating that the preheating step is done (e.g., that the sensed oven temperature matches a desired temperature).

In some examples, the processing logic of the appliance may further be configured to display and/or transmit a notification to a secondary user in response to not receiving a signal and/or data indicating the completion of the secondary user's task, and/or receiving data indicating the task has not been completed. In some examples, the processing logic of the appliance and/or a computing device in communication with the appliance is configured to additionally or alternatively notify the primary user that the secondary user's task has not been completed. In some examples, the processing logic of the oven and/or computing device is configured to pause or terminate one or more remaining steps of a scheduled cooking routine (e.g., commencement of an automated cooking program) in response to determining that the secondary user's task has not been performed (e.g., within a particular timeframe).

In some examples, the processing logic of the oven is configured to begin to operate the oven according to the cooking program in response to receiving information indicating that the secondary user's task (e.g., placing the food within the preheated oven) has been completed. The processing logic of the oven is configured to assign remote appliance control to the primary user in response to receiving the information indicating that the secondary user's task is complete, and/or in response to the cooking program beginning. Once control has been assigned to the primary user, the processing logic of the oven is configured to control the oven (e.g., control a heating element and/or other aspect of the oven) based on instructions received from the primary user (e.g., via digital device of the primary user.) For example, the primary user may adjust a parameter (e.g., temperature and/or time) of the cooking program being executed by the appliance. The primary user may adjust a current setting of the program (e.g., an aspect of the step of the program currently being carried out) and/or a setting of a future step of the program than has not yet been reached. As an example, the primary user may realize that they will return home later than expected and will adjust the final step of the program, which has not yet been reached, to last until a later time than previously specified. Alternatively (or additionally), the primary user who is running late may remotely lower the temperature of the oven and command the oven to maintain that lower temperature indefinitely and/or until a particular time, so that the food will remain warm until the primary user arrives at home.

In some examples, remote control of the oven (or other appliance) is assisted by a camera and/or other sensor(s) of the appliance. The oven is configured to transmit sensed data (e.g., sensed images, sensed temperature, and/or any other suitable sensed data) to the primary user, thus allowing the primary user to monitor the status of the meal. The sensed data may be transmitted in real time, at predetermined intervals, at predetermined milestones (e.g., at a beginning or end of a step of the cooking program), and/or in response to a request by the primary user.

In some examples, the processing logic of the appliance is configured to communicate with device(s) of the primary user or secondary user(s) to transmit feedback about the routine such as an estimated completion time of the routine and/or a current status of the meal (or other process).

Aspects of the management system may be embodied as a computer method, computer system, or computer program product. Accordingly, aspects of the management system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the management system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the management system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the management system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the management system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative appliance management systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Appliance Management System

As shown in FIG. 1, this section describes an illustrative appliance management system 10 (including an appliance 12 and related components). Appliance management system 10 is an example of the appliance management systems described in the Overview above.

Management system 10 includes at least one appliance 12 having a communication module 26 coupled to an electronic controller 20 configured to control appliance 12. Controller 20 includes processing logic 22 coupled to a memory 24. Appliance 12 may comprise any suitable appliance configured to be controlled remotely (e.g., by instructions communicated from a computer or other suitable device) and to perform at least some functions automatically (e.g., based on input from one or more sensors of the appliance, and/or in any other suitable manner). Appliance 12 may for example be a kitchen appliance (e.g., a refrigerator, oven, microwave, coffeemaker, blender, etc.), a household appliance (e.g., a water dispenser, vacuum cleaner, laundry washer, laundry dryer, etc.), and/or any other suitable appliance.

In some examples, appliance 12 is a smart appliance configured to communicate with a smart home platform and/or to be controlled via a smart home system. Management system 10 is configured to allow a primary user to select or create a set of instructions (AKA a routine) for accomplishing a chore using appliance 12. The routine includes at least one step to be carried out autonomously or semi-autonomously by appliance 12 and at least one task that is performed by a secondary user who is present at the appliance.

Appliance 12 further includes one or more operating elements 28 operatively coupled to controller 20, such that the controller is configured to selectively control the operation of the one or more operating elements to cause the appliance to perform a function (e.g., a cooking function, a cleaning function, and/or any other function appropriate to the appliance). Operating elements 28 may include any suitable device(s) configured to perform a function of appliance 12. For example, in examples wherein appliance 12 comprises an oven, operating elements 28 may include a heating element. In examples wherein appliance 12 comprises an electric blender, operating elements 28 may include a blender blade.

Appliance 12 further includes a user interface 30 operatively coupled to electronic controller 20. Interface 30 is configured to receive user input and to provide user output (e.g., via one or more display elements of the interface). Electronic controller 20 is configured to receive commands via user interface 30 and to operate appliance 12 according to the received commands. User interface 30 may include any suitable control feature(s) such as one or more control knobs, buttons, switches, screens, and/or touch pads. Controller 20 is further configured to receive commands from a computing system 16 (e.g., a mobile digital device) operated by the primary user, such that the primary user can remotely control the appliance.

Electronic controller 20 is configured to transfer control of the appliance from user interface 30 to primary computing system 16, such that control is transferred from the onsite secondary user to the remote primary user. To transfer control of the appliance to the remote primary user, electronic controller 20 enables appliance 12 to receive instructions from computing system 16 and may disable some or all manual controls of the appliance, such that a secondary user cannot directly control the appliance operation via user interface 30. Put another way, the controller transitions the appliance to a remote-control state in which the appliance responds to input received via communication module 26 but not to input received via interface 30. In some examples, when the appliance is in the remote-control state, interface 30 is disabled such that it cannot receive input. In some examples, the interface is able to receive input but the controller is configured to refrain from responding to the input. In this case, the input may be disregarded entirely, a message may be transmitted to the primary user asking them to approve or reject the input, and/or the input may be handled in any other suitable manner.

In some examples, one or more safety switches or other controls of the appliance are still operable in the remote-control state, such that the appliance can be turned off and/or otherwise transitioned to a safe state in case of a potentially dangerous situation (e.g., to avoid a fire). For example, a power switch, gas supply switch, and/or other suitable device may be operable in the remote-control state.

Controller 20 is configured to transition the appliance to the remote-control state in response to information indicating that the onsite secondary user has completed a particular task. In some examples, the indication comprises input received via interface 30. For example, the secondary user may press a button of interface 30 to indicate that they have performed the task, or the secondary user may input information via a graphical user interface of interface 30 indicating that they have performed the task. In some examples, performing the task includes closing a door of the appliance (for example, the task may be inserting food into a chamber of the appliance and closing the door), and the indication that the task has been performed comprises data sensed by a sensor of the appliance indicating that the door is closed. For example, the controller may be configured to transfer control based on sensed data indicating that the door has been opened and subsequently closed within a certain time period from being opened, that the door has been opened and then closed at a certain time of day, and/or any other suitable data associated with performance of a task using the appliance.

In some examples, electronic controller 20 is configured to produce a human-perceptible indication using appliance 12 to provide indication(s) to the secondary user (e.g., to prompt the secondary user to perform a task, to notify the secondary user of a problem, and/or otherwise communicate with the secondary user). For example, the controller may illuminate a light of the appliance and/or cause the appliance to produce a noise. In some examples, electronic controller 20 is configured to communicate with other appliances, devices, and/or systems within the home (e.g., via a smart home platform 14) to activate and/or manipulate lighting devices of the home, or otherwise produce visual or audible cues (e.g., via flashing kitchen lights, buzzing smoke alarms, information displayed on televisions or other monitors in the home, etc.). In some examples, controller 20 and/or communication module 26 are configured to cause a message or other indication to be transmitted to a computing system 18 (e.g., a mobile phone) of the secondary user.

Appliance 12 includes one or more sensors 32 coupled to electronic controller 20. In some examples, electronic controller 20 is configured to automatically control appliance 12 (e.g., via operating elements 28) based at least in part on data sensed by sensor(s) 32. Alternatively, or additionally, controller 20 may be configured to transmit information based on data sensed by sensor(s) 32 to primary user device 16 and/or other suitable recipient(s) (e.g., to facilitate remote monitoring of the appliance's operation). In examples in which the controller is configured to transfer control to the primary user based on sensed data associated with an open and/or closed state of the door, sensor(s) 32 include at least one sensor configured to sense that the door is closed (e.g., a switch sensor, a photosensor, and/or any other suitable sensor).

Sensor(s) 32 may further include one or more sensors configured to sense any data suitable for monitoring and/or operating appliance 12. For example, sensor(s) 32 may include a weight sensor or other sensor suitable for detecting the presence of laundry within a tub of a washing machine appliance, a temperature sensor configured to sense a temperature of a cooking chamber of an oven, internal temperature of food being cooked by an oven or other cooking appliance, and/or any other suitable sensor(s). Sensor(s) 32 may be disposed in and/or on any part of the appliance suitable for sensing the appropriate data.

Communication module 26 coupled to electronic controller 20 may comprise any suitable hardware and/or software configured to communicate with computing system 16 operated by the primary user. Communication module 26 may be configured to communicate with device 16 via a home (e.g., local area) network, a smart home assistant and/or platform 14 (e.g., a Google home system or Amazon Alexa system), and/or in any other suitable manner. In the depicted example, the communication module is configured to receive instruction(s) from the primary user's computing system (e.g., during the remote-control phase of operation) and to transmit data sensed by sensor(s) 32 and/or information based on the sensed data to the primary user's computing system.

In some examples, appliance 12 is further configured to communicate with other appliances, devices, and/or systems within the home (e.g., directly and/or via smart home platform 14). For example, electronic controller 20 may be configured to communicate with a mobile device 18 of the secondary user (e.g., to transmit sensed data, transmit notifications (e.g., a prompt to perform a task), and/or receive an indication that the task has been performed). The communication module may comprise a wireless communication module and/or any other suitable communication module.

In some examples, communication module 26 is configured to communicate with the primary user's mobile device 16 and optionally secondary user's mobile device 18 via a smartphone application 34 executed by the respective mobile devices. Smartphone application 34 is configured to receive user inputted information and to transmit data based on the inputted information to electronic controller 20 by way of communication module 26. Smartphone application 34 may comprise any format suitable for collecting user input. In some examples, smart phone application may comprise a form which can be filled out by the user. In some examples, smart phone application 34 comprises a selection and specification layout, such that the primary user may select input from a menu (e.g., the primary user may select from a menu a command such as "Show me the current oven temperature" or "Set oven to warm.") Smart phone application 34 may be configured to receive messages, notifications, and/or monitoring data directly or indirectly from electronic controller 20. The smartphone application may comprise a dedicated application platform specific to appliance 12, or may be part of an application of a smart home platform (e.g., an instance of the HomeConnect application and/or any other suitable application).

B. Illustrative Oven Management System

Figure 2:
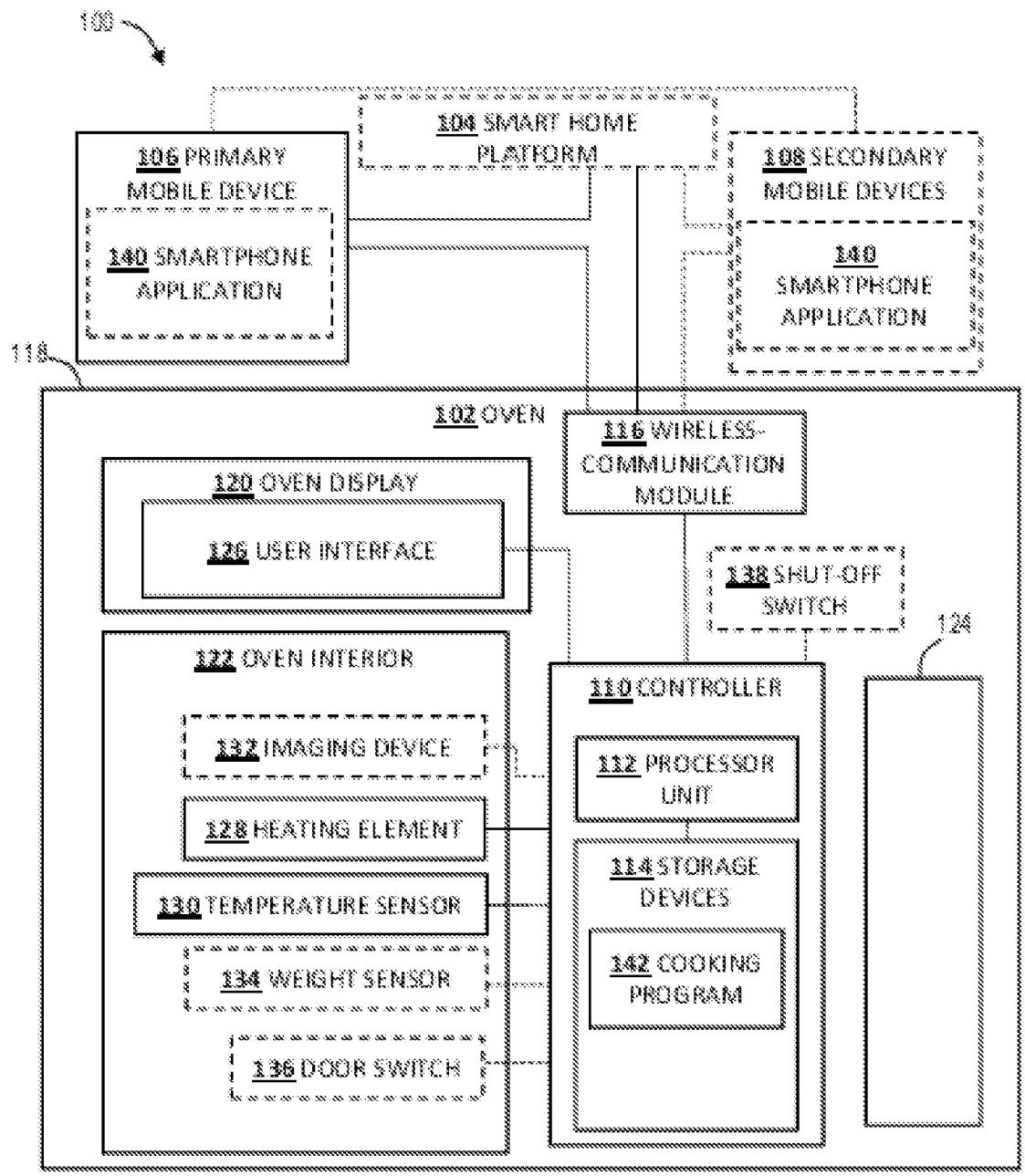
FIG. 2 is a schematic diagram of an example appliance management system including an oven, in accordance with aspects of the present disclosure.
Figure 3:
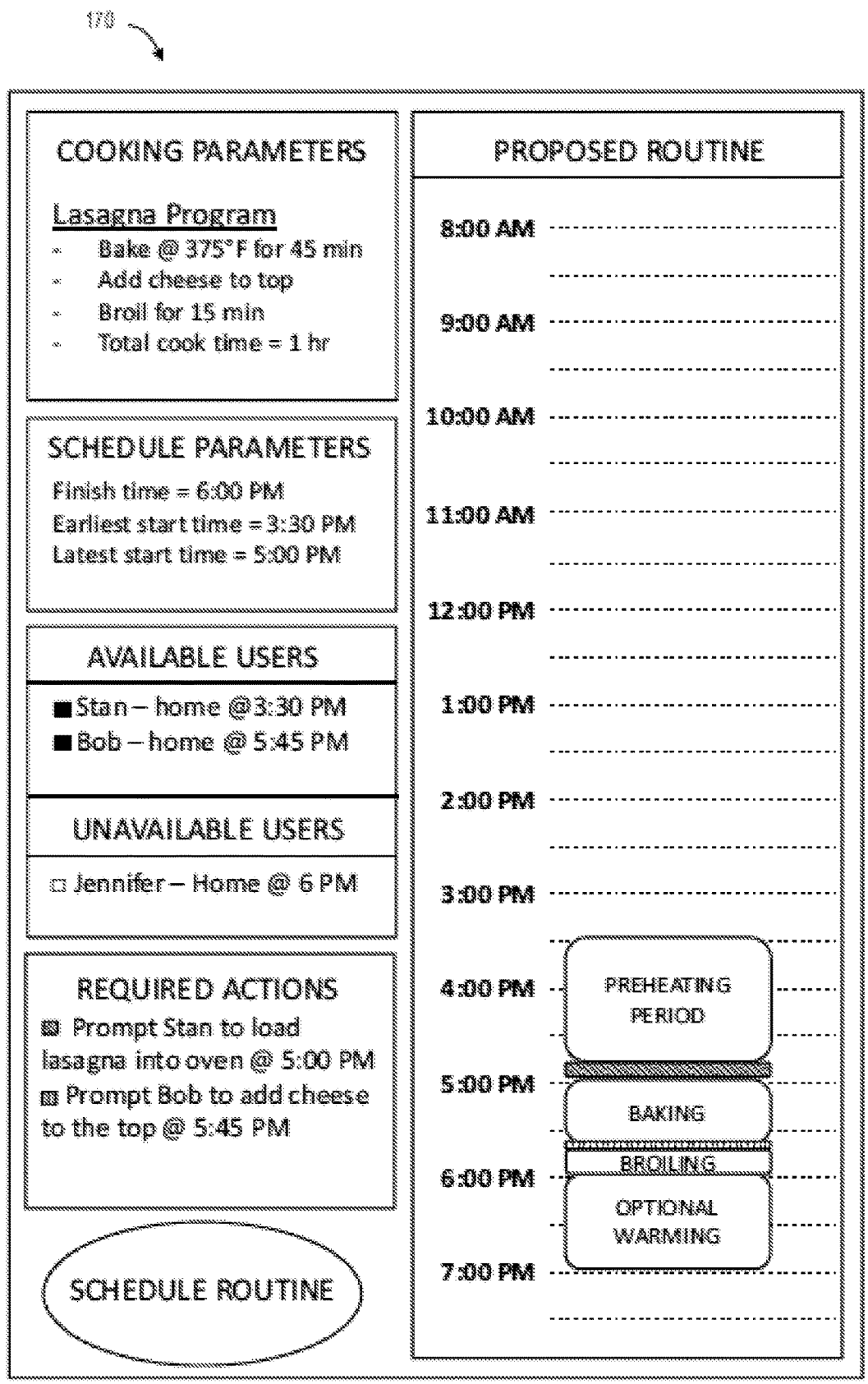
FIG. 3 is an illustrative schedule of a cooking routine of an appliance management system in accordance with aspects of the present disclosure.
Figure 4:
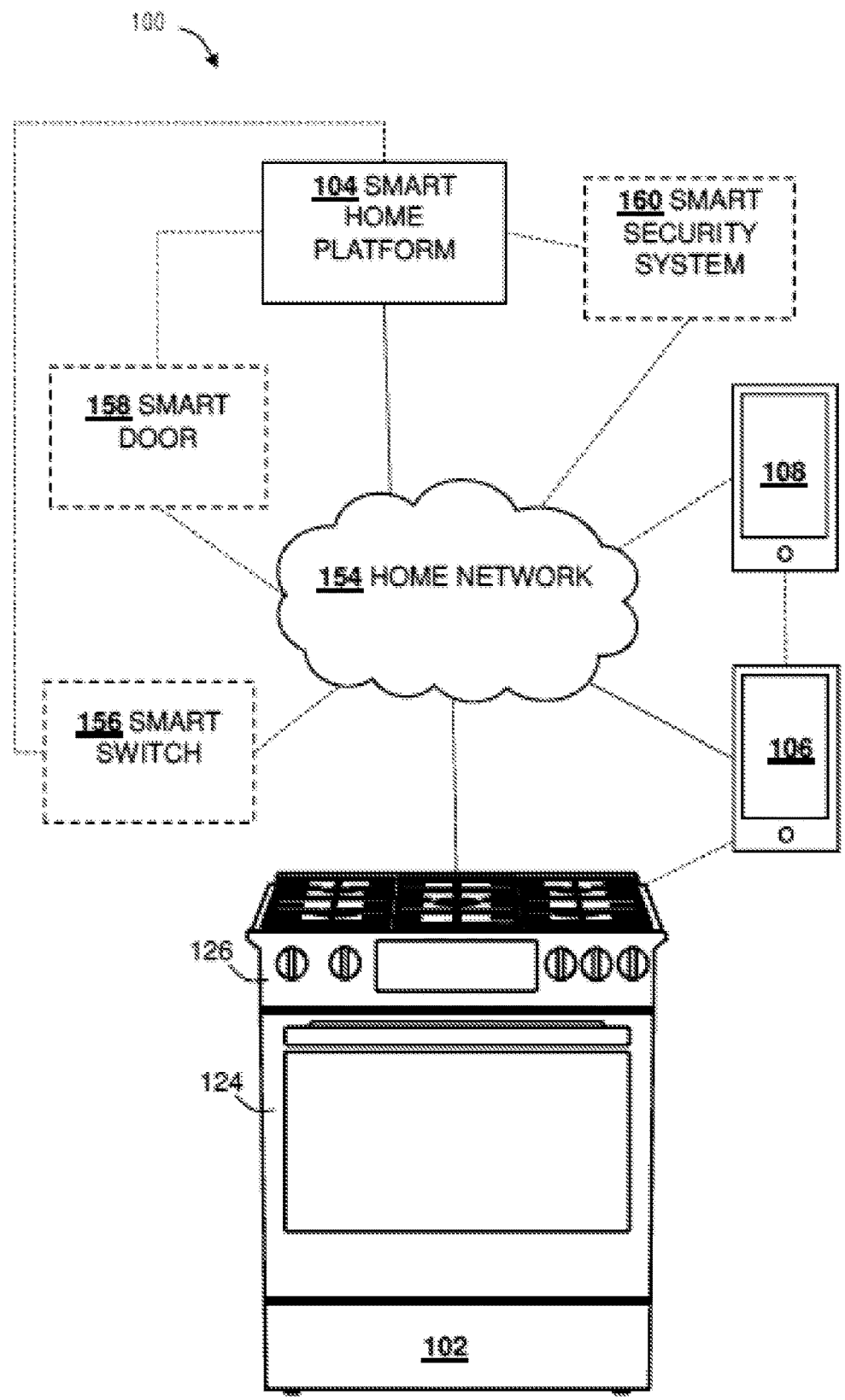
FIG. 4 is a schematic diagram of an illustrative smart home system including an oven management system in accordance with aspects of the present disclosure.

As shown in FIGS. 2-4, this section describes an illustrative oven management system 100 including an oven 102. Oven management system 100 is an example of appliance management system 10 described above.

Management system 100 includes an oven 102 having an electronic controller 110 configured to control oven 102. Optionally, management system 100 includes and/or is part of a smart home platform (e.g., a Google home system or Amazon Alexa system), as described further below.

Electronic controller 110 includes processing logic 112 coupled to a memory device 114. Controller 110 is configured to receive data specifying a cooking routine, the routine including at least one operational stage to be executed by the controller (e.g., a stage in which the controller controls the oven to bake food at a predetermined temperature for a predetermined time period) and at least one task to be performed by a secondary user at the oven (e.g., inserting food into the oven). Controller 110 is further configured to at least semi-automatically operate oven 102 according to the operational stage of the received routine, transmit notification(s) to the secondary user to perform the task, and transfer appliance control to a remote primary user (e.g., by disabling manual inputs and responding to commands received from a device operated by the primary user).

Oven 102 further includes one or more sensors configured to collect observational data, which is received by electronic controller 110. Observational data received by electronic controller 20 may include current time of day, user and/or object presence, oven cavity temperature, internal temperature of food, object weight, and/or any other suitable data. In the depicted example, oven 102 includes at least an imaging device 132 configured to acquire imaging data of an oven interior (AKA an oven cavity or chamber) 122, a temperature sensor 130 configured to sense a temperature of the interior, a weight sensor configured to sense weight of object(s) in the oven interior, and a door switch 136 configured to sense whether a door 124 of the interior is closed. In some examples, system 100 includes sensors other than sensors of oven 102, such as a sensor configured to sense the presence of one or more persons in the vicinity of the oven.

Oven 102 includes an oven body 118 having an oven display 120 and interior 122. The oven cavity is accessed through an opening on a front surface of oven body 118. Oven door 124 is configured to selectively cover the opening of oven cavity 122. Door 124 may be coupled to oven body 118 by any suitable hinge(s) and/or other devices configured to allow the door to be selectively opened to expose the cavity and closed to close the cavity.

Oven display 120 is disposed on a front surface of the oven body (and/or any other suitable location), such that the display is visible and accessible to a user. Oven display 120 may include any suitable device(s) configured to display information, such as a timer, a signal light, and/or any other suitable components. Display 120 further includes a user interface 126 (AKA a control panel) coupled to controller 110 and configured to allow a user to control one or more aspects of the oven's operation. In some examples, the user interface is separate from the display instead of being part of the display.

A user interface 126 comprises a plurality of control features configured to allow a user to control elements and/or systems of oven 102. For example, user interface 126 may facilitate user selection of operational oven parameters such as temperature, cooking time, cooking mode (e.g., bake, broil, etc.). The control features of the user interface 126 may include one or more control knobs, buttons, switches, screens, touch-pads, and/or any other suitable device(s). Control features of interface 126 may be coupled to controller 110, such that the user operates the interface to control the oven via controller 110, and/or coupled directly to operational element(s) of the oven such as a heating element, such that the user operates the interface to control the oven operation directly.

In some examples, user interface 126 is configured to receive an instruction for the controller to operate the oven in accordance with an automatic cooking program, which may be selected and/or created by the user via the interface. A cooking program may include instructions for the controller to control the oven based on an estimated cooking time, target interior temperature of a food item, cooking mode (e.g., bake, roast, broil, etc.), and/or any other suitable information relating to the preparation and/or cooking of the food item associated with the program.

In some examples, electronic controller 110 is configured to receive information comprising a cooking routine via user interface 126. Additionally or alternatively, electronic controller 110 may be configured to communicate with a primary computing system (AKA primary mobile device) 106 operated by a primary user to receive the cooking routine from system 106. In some examples, the primary user inputs the routine (or aspects of the routine) via a smartphone application 140 executed by primary mobile device 106, and controller 110 is configured to operate oven 102 according to the routine. Primary computing device 106 may be configured to communicate with a communication module 116 of the oven directly, via smart home platform 104, and/or in any other suitable manner.

As described above, a cooking routine generally includes at least one step to be performed automatically by the electronic controller and at least one action to be taken by the secondary user who is present at the appliance. The step(s) performed automatically by the electronic controller may comprise an automatic cooking program, e.g., a set of instructions for operating the oven at one or more predetermined temperatures and/or settings for a predetermined time and/or until a predetermined criterion is satisfied. A cooking program may be created by inputting cooking parameters (e.g., generic cooking mode, temperature, and time), selected from a list of stored meal cooking programs in a memory 114 of controller 110, and/or established in any other suitable manner.

The primary user further selects scheduling and/or action parameters for the cooking routine. Scheduling parameters may include a desired starting time for a first step of the routine, a desired finishing time for the food to be finished cooking, an acceptable buffer period, e.g., a period of time before or after the desired starting (or finishing) time during which it is acceptable for the cooking routine to begin (or finish), and/or an earliest and/or latest allowed start time for the cooking routine. An action parameter may identify one or more task(s) (e.g., putting food into an oven; removing a tray from an oven, stirring food on the tray, and putting the tray back in the oven; etc.) to be performed by a secondary user at particular point(s) during the cooking routine. Controller 110 controls the oven to execute the cooking routine based at least in part on the scheduling parameters and action parameters.

Based at least in part on the scheduling and/or action parameters, controller 110 and/or a computer in communication with the oven (e.g., a server of the smart home platform) is configured to determine a time at which to begin one or more phases of the cooking routine. For example, the controller or computer may determine a time at which to begin preheating the oven, a time at which to prompt the secondary user to insert food into the oven, a time at which a step of an automatic cooking program should begin (or end), and/or any other suitable timing factors. In some examples, determining the timing factors includes determining, based on the cooking routine information received from the primary user (via the oven interface and/or the primary user's device), a total cook time, and/or an estimated completion time of some or all automatic cooking step(s) and/or secondary user task(s) included in the received cooking routine. In some examples, the controller or computer is configured to identify any intermediate tasks (not already specified by the primary user) that may need to be taken by the secondary user before the cooking routine is completed.

In some examples, (e.g., when the earliest and/or latest allowed start time are not specified by the primary user in creating the routine), electronic controller 110 or a computer in communication with the oven may be configured to determine the earliest and/or latest start times allowed based on the scheduling parameters received from the primary user, a predicted total cook time, an estimated total time of routine, and/or any other suitable factor(s). In some examples, the controller or computer is further configured to determine which of a plurality of potential secondary user(s) should be notified to perform a task. Additionally, or alternatively, the cooking routine may comprise a selection by the primary user of one or more specific secondary user(s) to receive an alert and/or notification from the controller 110 and/or smart home system or other platform to perform the task. For example, the notification may comprise a message on a mobile digital device of the selected secondary user.

FIG. 3 depicts an illustrative schedule 170 produced by management system 100 of FIG. 2 based on user input in the following illustrative situation. Jennifer, the primary user, is the primary cook in her household. She does not get home from work until 5:45 PM and the family is always hungry for dinner at 6 PM. She has a teenage child (Stan) and a husband (Bob) who are typically not involved in cooking or preparing meals. The family is having lasagna tomorrow night, so tonight, Jennifer assembles the uncooked lasagna ingredients in a dish and places it in the refrigerator, still uncooked. Using a smartphone application, she indicates that tomorrow the oven should bake the lasagna at 375 degrees Fahrenheit for 45 minutes, and after cheese has been added to the top of the lasagna, broil for 15 minutes. She further indicates that the lasagna should be finished cooking at 6 PM and cannot be started earlier than 3:30 PM (when Stan gets home from school). She selects both Stan and Bob as secondary users to be notified. She indicates that the routine requires two secondary user actions: inserting the lasagna into the oven (after removing it from the refrigerator) and adding cheese to the top of the lasagna after the baking step. She indicates a preference that Stan be prompted to load the lasagna in the oven and Bob be prompted to add the cheese.

Based on the desired finish time, total cooking time of one hour, and earliest start time, the system (e.g., a server of the system, the smartphone application, and/or a controller of the oven) automatically determines that the insertion of the lasagna into the oven and the baking step should commence no later than 5 PM and the addition of cheese and the broiling step should commence no later than 5:45 PM. If the system does not detect that the insertion task has been performed by 5 PM (or a predetermined buffer period afterward, e.g., 10 minutes), the system notifies Jennifer via her smartphone. Similarly, the system notifies Jennifer if the cheese addition task has not been performed by 5:45 or within a predetermined period after.

Although 5 PM is the latest time at which the baking step should commence and thus approximately the latest time at which Stan should load the lasagna into the oven, the system may be configured to notify Stan at some point earlier than 5 PM that he should load the lasagna no later than 5 PM. This gives Stan some flexibility in performing his task. The amount of flexibility may be selected by Jennifer. For example, Jennifer may select a buffer period of thirty minutes, such that Stan is told to insert the lasagna at some point between 4:30 PM and 5 PM.

In the depicted example, the routine further includes a preheating period before the insertion task and an optional warming period after 6 PM. The system automatically schedules a preheating period to start at 3:30 PM, the earliest start time. Regarding the warming period, if the lasagna has not been removed from the oven by 6 PM, the oven temperature is lowered to a temperature sufficient to keep the oven warm without significantly cooking it further, so that it remains warm until the family is ready to eat it. Because the warming period is optional, the system does not take it into account when determining start and finish times.

The schedule depicted in FIG. 3 may represent the interface of a smartphone application used by Jennifer to input scheduling parameters such as the desired finish time and earliest start time and action parameters such as the insertion and cheese tasks, to view the proposed schedule automatically generated by the system based on her input, and to confirm the routine by pressing the "Schedule Routine" interface button.

Returning to FIG. 2, electronic controller 110 is configured to receive data from one or more sensors to monitor and control operation of oven 102 according to the received cooking routine. In the depicted example, controller 110 is coupled to a heating element 128, a temperature sensor 130, an imaging device 132, a weight sensor 134, a door switch 136, and a shut-off switch 138.

Storage device 114 of controller 110 is configured to store information such as data, program code, system instructions, and/or other suitable information, either temporarily or permanently. The storage device of controller 110 stores information relating to the operation of oven 102 and implementation of management system 100, such as meal cooking program(s) 142, image analysis programs configured to analyze data sensed by the imaging device, and/or any other applicable instructions and/or programs.

Oven 102 includes one or more heating element(s) 128 configured to heat the oven cavity 122 (e.g., to be controlled by controller 110 to heat the cavity in accordance with a scheduled cooking routine and/or a selected meal cooking program, or to heat the cavity based on manual control). Heating elements 128 may be disposed at any suitable location that facilitates heating of the oven cavity, such as within the oven cavity, in a peripheral wall of the oven, and/or underneath a floor of the oven cavity.

Optionally, oven 102 further includes safety features (e.g., a power switch, gas supply switch, etc.) that remain operable regardless of the status of a cooking routine or whether the appliance is being controlled remotely. In the depicted example, the safety features include a shut-off switch 138 configured to selectively disable power to heating element 128. When controller 110 has disabled manual control of the oven and assigned remote control to the primary user, shut-off switch 138 remains active such that it may still be operated by an on-site user for safety. This allows the on-site user (i.e., secondary user) to shut down the oven in case of an emergency.

Oven 102 further includes one or more temperature sensors 130 coupled to controller 110. Electronic controller 110 is configured to receive data from sensor 130. The temperature sensor may sense an actual temperature of the cavity and/or may sense that the temperature of the cavity has reached a specified oven temperature. Temperature sensor 130 may include a thermometer and/or any other suitable temperature sensor disposed within the oven cavity, on or in an interior wall or surface of oven cavity 122, and/or at any location suitable for sensing a temperature of the cavity and/or its contents. Temperature sensor 130 may include one or more thermistors, infrared temperature sensors, probes, and/or any other suitable devices.

Based on data received from the temperature sensor, controller 110 is configured to determine, e.g., when preheating is complete and/or when the oven cavity is at the correct temperature to proceed with a task and/or step of the cooking routine.

Oven cavity 122 may optionally comprise one or more cavity monitoring devices configured to determine whether a food item(s) is present within the oven cavity. Cavity monitoring devices may include an imaging device 132 (e.g., a camera) configured to produce images of the oven cavity, a weight sensor 134 configured to determine based on weight whether an item is present at a certain location in the cavity, and/or any other suitable sensor(s).

Images acquired by imaging device 132 of oven cavity 122 and any objects within the oven cavity may be analyzed (e.g., by controller 110 and/or a computer in communication with the controller and/or imaging device) to, e.g., identify the presence or absence of food item within the oven cavity, and/or a condition (e.g., a degree of doneness) of the item(s). This allows the controller and/or computer to, e.g., determine a status of step(s) and/or task(s) assigned to a secondary user, such as putting the meal and/or food item(s) in the oven. Imaging device 132 may be mounted to one or more interior surfaces of oven cavity 122. Device 132 may comprise any suitable device configured to acquire images (e.g., digital images) and/or scans of the oven cavity. In some examples, device 132 comprises a camera operating in the visible-light range.

Weight sensor(s) 134 coupled to controller 110 may be mounted to one or more of devices configured to support an oven rack (e.g., vertically spaced protrusions on the cavity wall), such that the weight sensor may sense information relating to the weight of food item(s) on the rack. In some examples, a weight sensed by weight sensor 134 is compared to a base weight of the oven rack without any items on it, such that when an item is placed on the oven rack, the addition of the item to the rack can be detected based on the change in weight. This allows controller 110 to determine the status of step(s) and/or task(s) assigned to the secondary user, such as putting food item(s) in the oven.

Oven 102 further includes door switch 136 configured to sense whether oven door 124 is closed. For example, door switch 136 may be configured to sense that surfaces of oven door 124 and oven cavity 122 are separated from one another and/or to sense that the surfaces of the door and cavity are in contact with each other. The controller, which is coupled to the door switch, may be configured to control the oven based at least in part on sensed data. For example, information about the status of the door may represent information about the status of manual tasks assigned to the secondary user. Accordingly, in response to sensed data indicating that the door has opened and then closed within a predetermined time period or has transitioned from an opened state to a closed state after a particular time of day, which indicates that the secondary user has performed the manual task at the appliance, the electronic controller may commence a step of an automated cooking program.

In the depicted example, management system 100 further includes the primary mobile device 106, optionally a secondary mobile device 108 operated by the secondary user, and optionally a smart home assistant and/or platform 104 (e.g., a Google home system or Amazon Alexa system) that communicate with oven 102 via communication module 116. Module 116 may be configured to communicate with primary mobile device 106 and/or secondary mobile device 108 via a home (e.g., local area) network, via the smart home assistant and/or platform 104 (e.g., a Google home system or Amazon Alexa system), via the Internet, via a cellular network, and/or in any other suitable manner.

Primary device 106 is operated by the primary user. Electronic controller 110 (e.g., when transferring appliance controls to the primary user) is configured to enable oven 102 to receive instructions from primary mobile device 106, and may be further configured to transmit information based on data sensed by sensor(s) of the oven to the primary user's mobile device. Secondary device 108 is operated by the secondary user and may be used, e.g., to display a prompt to the secondary user to perform a task, and/or to receive an indication input by the secondary user that the task has been performed. In some examples, electronic controller 110 and/or smart home platform 104 is configured to detect the presence of particular secondary user(s) within a house by detecting network connection of a secondary user's mobile device (i.e., secondary mobile device 108) to a home network. For example, in relation to the situation depicted in FIG. 3, the system may be configured to monitor for Stan's presence and begin preheating the oven in response to detecting that Stan has arrived home, or that Stan has arrived home and it is after 3:30 PM.

As described above, electronic controller 110 may be configured to transmit one or more notification(s) to secondary mobile device 108 using communication module 116 to prompt the secondary user to perform a task. Additionally or alternatively, controller 110 may be configured to control component(s) of oven 102 to produce a human-perceptible indication (e.g., a light and/or noise produced by display 120 and/or any other suitable device of the oven and/or coupled to the oven, an alphanumeric notification on display 120, and/or any other suitable indication). In some examples, electronic controller 110 is further configured to communicate with other appliances, devices, and/or systems within the home (e.g., via smart home platform 104) to activate and/or manipulate lighting, visual, or audible cues elsewhere in the household (e.g., flashing lights, buzzing alarms, etc.).

FIG. 4 depicts an example in which management system 100 is integrated with a smart home system including a smart switch 156, smart door 158, and/or a smart security system 160 configured to communicate with home network 154 and smart home server 104 (either directly or via network 154).

In some examples, smart home platform 104 is further configured to receive data from smart switch 156, smart door 158, and/or smart security system 160 indicating that a user is present in the house. Suitable data may be based on, e.g., image data acquired by a smart security system camera that shows the user, sensed data indicating that one or more smart doors have been opened (e.g., an exterior door of a home, a door of a particular user's bedroom, and/or any other suitable door), and/or any other suitable basis. Based on received data indicating the presence of one or more users in the home, platform 104 may take a suitable action such as selecting a present user to receive a notification to perform a task, transmitting the notification to a mobile device of a present user, and/or any other suitable action. Additionally or alternatively, electronic controller 110 may be further configured to receive information indicating user presence from platform 104 and/or directly from smart switches 156, doors 158, security system 160 and/or any other suitable devices and systems.

In some examples, electronic controller 110 is configured to automatically begin preheating oven cavity 122 in response to an indication that the secondary user(s) has been detected within the house (e.g., by the connected smart monitoring devices and/or platform). In some examples, electronic controller 110 is configured to automatically start preheating oven 102 in response to detecting that the current time of day is past the earliest allowed start time of the scheduled cooking routine and the selected secondary user(s) is detected in the house.

C. Illustrative Method of Operating an Oven Management System

Figure 5:
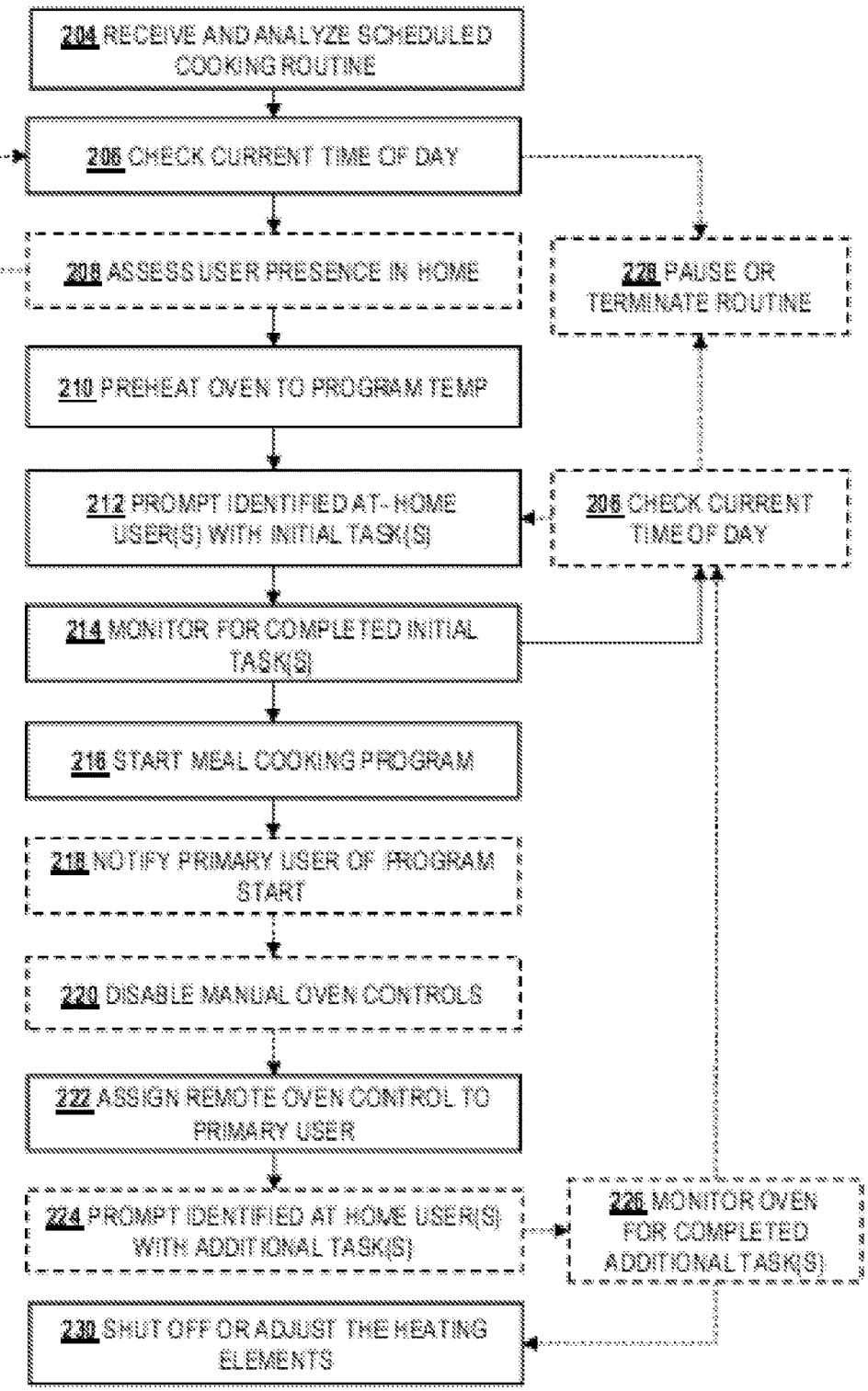
FIG. 5 is a flow chart depicting steps of an illustrative method for controlling a cooking appliance in accordance with aspects of the present disclosure.

This section describes steps of an illustrative method 200 for controlling an oven according to a scheduled cooking routine; see FIG. 5. Aspects of appliance management system 10 and/or 100 may be utilized in the method steps described below. Where appropriate, reference may be made to components and systems that may be used in carrying out each step. These references are for illustration, and are not intended to limit the possible ways of carrying out any particular step of the method.

FIG. 5 is a flowchart illustrating steps performed in an illustrative method, and may not recite the complete process or all steps of the method. Although various steps of method 200 are described below and depicted in FIG. 5, the steps need not necessarily all be performed, and in some cases may be performed simultaneously or in a different order than the order shown.

Step 204 of method 200 includes receiving and analyzing data of a scheduled cooking routine. The data is received at and analyzed by an electronic controller of an oven or other suitable appliance that will carry out at least part of the routine. The data is transmitted to and/or input at the oven by a primary user who is expected not to be present at the oven during at least part of the routine. The electronic controller of the oven is configured to analyze the received data and determine a tentative schedule for the cooking routine that satisfies all parameters of the cooking routine.

The cooking routine may include parameter(s) selected or determined by the primary user such as a cooking program comprising steps to be executed by the controller, scheduling parameters, and/or other parameters. The routine further includes a task to be performed by a secondary user who will be at the oven (e.g., a manual or otherwise hands-on task including an action to be taken at the oven, such as putting food into an oven; removing a tray from an oven, stirring food on the tray, and putting the tray back in the oven; and/or any other suitable task). The cooking program of the routine includes instructions on how the oven should operate automatically and comprises cooking parameters (e.g., generic cooking mode, temperature, and time) and/or other suitable information. The scheduling parameters of the routine indicate, e.g., when the controller is to begin executing step(s) of the cooking program and/or prompting task(s) to a secondary user. The scheduling parameters may include a desired starting or finishing time for the meal to begin or finish cooking, an acceptable buffer period (i.e., a period of time before or after the desired starting (or finishing) time during which it is acceptable for the cooking routine to begin (or finish)), and/or an earliest and/or latest allowed start time for the cooking routine. Additionally, the cooking routine may comprise a selection (e.g., by input from the primary user, and/or on any other suitable basis) of one or more specific secondary user(s) to receive an alert and/or notification from the electronic controller to perform the task (e.g., via a message on a mobile digital device of the selected secondary user).

This step further includes analyzing the cooking parameters of the selected or created meal cooking program to determine a total cook time, and/or determine an estimated completion time of cooking program steps and/or secondary user's task(s) included in the received cooking routine. Step 204 further includes the electronic controller determining an estimated total time of routine (i.e., a sum of the total cook time and the estimated completion time of task(s), and/or determining if any intermediate tasks (not already specified by the primary user) may need to be taken by the secondary user before the cooking routine is completed. In some examples, (e.g., when the earliest and/or latest allowed start times are not specified by the primary user in the scheduling parameters) this step also includes determining an earliest and/or latest allowed start times based on the scheduling parameters received from the primary user, a predicted total cook time, an estimated total time of routine, and/or any other suitable factor(s). This step may also include identifying which secondary user(s) should be notified for completion of a task.

Step 206 of method 200 includes receiving signals and/or data indicating current time of day and comparing it to the earliest and/or latest allowed start times. In this step, the controller receives and monitors the signals and/or data indicating current time of day and compares it to the earliest and/or latest allowed start times to determine whether to initiate the cooking routine. In some examples, obtaining the current time and comparing it to the earliest and/or latest time is performed by an external processor in communication with the controller rather than the controller itself.

In response to determining that the current time of day is before the earliest allowed start time, the controller continues to monitor and/or recheck current time of day until current time of day is the earliest allowed start time or after the earliest allowed start time. In response to the controller receiving a signal and/or data indicating that the current time of day is between the earliest allowed start time and the latest allowed start time, the controller initiates a step of the scheduled cooking routine. In some examples, the controller, in response to receiving a signal and/or data indicating that the current time of day is past the latest allowed start time, the controller transmits to a device operated by the primary user a notification that the scheduled cooking routine has either been paused or terminated because the current time of day is past the latest allowed start time.

Step 208 of method 200 is optional and includes receiving signal(s) and/or data from one or more connected (e.g., networked) devices to assess a selected secondary user(s) presence within the house and/or identify what user(s) is present in the house. In some examples, the controller receives signals and/or data from the one or more network-connected devices and/or systems of the house that monitors a home (e.g., local area) network and/or identifies the presence of secondary user(s) within a house by detecting network connection of a secondary user's mobile device to the home network.

Alternatively or additionally, the controller may be configured to receive signals and/or data (via. the home network or a connected smart home platform) from one or more smart monitoring devices and/or systems such as smart switches, smart doors, and/or a security system configured to detect when one or more of the secondary users has entered the house. In some examples, the smart home platform is configured to transmit a signal and/or data to the controller indicating that a user has been detected. In some examples, the controller is configured to directly communicate with the smart monitoring devices and/or systems to receive and/or transmit signal(s) and/or data indicating that a user has entered the home. In some examples, this information is not transmitted to the controller and is handled by the smart home platform.

In cases where no user is detected, the controller (and/or smart home platform) is configured to check current time and communicate with one or more smart monitoring devices and/or systems to continue monitoring for secondary user(s) until current time of day is past the latest allowed start time, in response to which the controller and/or smart home platform sends a message to the primary user (e.g., via the primary user's cell phone) notifying them that no secondary user is present.

Step 210 of method 200 includes controlling a heating element of the oven to preheating the oven to a program temp in accordance with the scheduled cooking routine. In some examples the controller is configured to begin preheating the oven in response to detecting one or more specific secondary user(s) within the house.

Step 212 of method 200 includes sending a notification to a secondary user (e.g., a secondary user identified as being present, a secondary user selected by the primary user, and/or any secondary user(s) able to see and/or hear the prompt) to perform one or more initial task(s). The notification may present a reminder and/or describe specific actions the secondary user must perform and/or complete before the scheduled cooking routine can proceed. In some examples, this step is accomplished by communicating with the selected secondary user's mobile device and sending a notification. The controller may additionally or alternatively control components of the appliance to produce a human-perceptible indication from the appliance (e.g., a light and/or noise produced by the appliance and/or one or more other devices coupled to the appliance) to alert the secondary user. In some examples, the controller additionally or alternatively, activates and/or manipulates lighting, visual, or audible cues elsewhere in the household through the connected devices.

Step 214 of method 200 includes receiving signals and/or data from one or more monitoring devices to monitor for completion of initial task(s). The controller may monitor progress of initial task(s) assigned to the identified secondary user(s) by receiving signals from one or more monitoring devices such as an imaging device, a weight sensor, a door switch, and/or any other appropriate sensors or components. For example, an image sensor may produce image data indicating that a particular food item is in the oven, a weight sensor may indicate that an object is present on a rack of the oven, and/or a door switch may indicate that a door was opened and closed. In some examples, monitoring for completion of the initial task includes receiving input from the secondary user indicating that the task has been complete; the input may be received at an interface of the appliance, a mobile device of the secondary user, and/or in any other suitable manner.

In some examples, the controller, in response to receiving a signal and/or data from the one or more monitoring devices indicating the completion of the initial task(s), communicates with the primary user's mobile device to inform them that the task has been completed Alternatively or additionally, if after a specified period of time, the controller does not receive a signal and/or data indicating that the initial task(s) completion, or receives a signal and/or data indicating that the initial task(s) have not been completed, the controller responds by transmitting a notification to the selected secondary user's device telling them that the task has not been completed. In examples where the secondary user(s) continually fails to perform and/or complete the assigned task(s), the controller may check the current time of day and continue to transmit notifications to the selected secondary user until the current time of day is after the latest allowable start time specified by the scheduled routine. In response to the secondary user(s) failing to perform and/or complete the assigned task(s) in time, the controller may pause or terminate the routine and transmit a notification to the primary user that the routine has either been paused or terminated because the initial task(s) have not been completed before the latest allowable start time of the routine. In some examples, before pausing or terminating the routine, the controller transmits a notification to the primary users that the initial task(s) has not been completed before the latest allowable time and that the routine may be paused or terminated if the task(s) is not completed.

Step 216 of method 200 includes starting the meal cooking program of the scheduled cooking routine in accordance with the cooking parameters of the selected or created meal cooking program. In some examples, the controller may look up the selected cooking program (e.g., in a database of automated cooking programs) and operate the oven in accordance with the cooking program found. The information associated with the selected meal cooking program may comprise one or more factors such as estimated cooking time, target interior temperature of a food item, appropriate cooking parameters and methods, and/or other information relating to the preparation and/or cooking of a food item associated with the program. In some examples, the controller may alternatively begin operation of the oven according to a newly created meal cooking program instead of a selected automated cooking program. The newly created cooking program comprises cooking parameters specified by the primary user such as appropriate oven temperature, cook time, and what cooking mode the oven should be on.

Step 218 of method 200 is optional and includes transmitting a notification to the primary user that the cooking program in accordance with the scheduled cooking routine has begun.

Step 220 of method 200 is optional and includes disabling manual control of the oven. Manual control of the oven is accomplished using control features found on a user interface of the oven that are configured to transmit signals and/or data with the controller of the oven to manage one or more elements and systems of the oven. Disabling the control features isolates the oven from any manual adjustments or changes an at-home user may attempt to make to the cooking parameters of the selected or created meal cooking program of the scheduled cooking routine. While manual control of the oven is disabled, the controller does not restrict the usage of a shut-off switch through which power to one or more heating elements of the oven is routed. This shut-off switch may be configured to be manually actuated by an at-home user to cut off power to the heating elements of the oven in case of an emergency.

Step 222 of method 200 includes communicating with the primary user's device to transfer remote oven control to the primary user, such that control of the oven is given to the primary user so that they may control the progress of the scheduled cooking routine. The controller may be configured to transmit an authorization code, password, link, and/or any other verifying device to the primary user's mobile device, which may automatically open a smartphone application associated with the oven. In some examples, the received authorization code or other verifying device is input by the primary user into the application to access oven control. To accomplish the transfer of control, the controller is enabled to receive and execute commands from the primary user's primary mobile device via the smartphone application or other interface.

Step 224 of method 200 is optional and includes sending a notification to the selected secondary (at-home) user(s) with additional task(s) to be performed and/or completed before the cooking routine may proceed. The notification may present a reminder and/or describe specific actions and/or task(s) the secondary user must perform and/or complete before the scheduled cooking routine is completed.

In some examples, this step is accomplished by transmitting a notification to the selected secondary user's mobile device. The controller may additionally or alternatively communicate with connected devices and/or components of the appliance to produce a human-perceptible indication from the appliance (e.g., a light and/or noise produced by the appliance and/or one or more other devices coupled to the appliance) to alert the secondary user. In some examples, the controller additionally or alternatively, activates and/or manipulates lighting, visual, or audible cues elsewhere in the household through the connected devices.

Step 226 is optional and includes monitoring for completion of the additional task (if any) via monitoring device(s) such as imaging sensors and/or weight sensors, input from the secondary user via an interface of the oven, and/or in any other suitable manner.

Alternatively or additionally, if before the allotted amount of time is up, the controller does not receive a signal and/or data indicating the additional task(s) completion or receives a signal and/or data indicating that the additional task(s) have not been completed, the controller transmits a notification to the selected secondary user's device again. In examples where the secondary user(s) fails to perform and/or complete the assigned additional task(s) in the allotted time period, the controller may pause the scheduled cooking routine and send a notification to the primary user that the routine has been paused because the additional task(s) was not completed in the allotted time period. In some examples, before pausing the routine, the controller transmits a notification to the primary users that the additional task(s) has not been completed in the allotted time period and that the routine may be paused if the task(s) is not completed.

Step 228 of method 200 is optional and includes pausing and/or terminating the scheduled cooking routine before the routine comes to completion. The controller may pause and/or terminate the scheduled cooking routine by cutting off or reducing power to the heating elements of the oven. Alternatively or additionally, the controller may pause the scheduled cooking routine by adjusting oven temperature to temperature suitable for keeping the meal and/or food item(s) warm and/or changing the cooking mode. In some examples, the controller, in response to receiving signals that indicate that the routine has not progressed (e.g., that a cooking program step scheduled to occur after completion of the initial secondary-user task has not started or finished) and the current time of day is past the latest allowable start time, terminates the scheduled cooking routine. In some examples, in response to receiving signals indicating that the initial task(s) have not been completed and the current time of day is past the latest allowed start time, the controller pauses and/or terminates the scheduled cooking routine (e.g., by shutting off heating elements of the oven). Alternatively or additionally, the controller may pause the scheduled cooking routine, in response to receiving signals that the additional task(s) have not been completed in the allotted period. In some examples, the controller may resume the routine once the task(s) has been completed. In some examples, the controller may resume the routine in response to the primary user prompting the controller to continue the routine regardless of whether the task(s) is completed.

Step 230 of method 200 includes shutting off the oven and/or adjusting the oven's operation (e.g., by shutting off or adjusting the heating elements of the oven). In some examples, the controller is configured to automatically shut off the heating elements of the oven in response to completion of the meal cooking program and/or in response to receiving a signal and/or data from the one or more monitoring devices that the food item(s) has been taken out. Alternatively or additionally, in some examples, the controller may receive a command from the primary user's mobile device to change the cooking mode and/or lower the oven temperature to accomplish a warming mode after the meal cooking program has completed. In the warming mode, the controller adjusts the heating elements to produce an oven temperature at which the food item(s) left in the oven are kept warm until they are removed from the oven.

D. Illustrative Method for Interacting with an Appliance Management System

Figure 6:
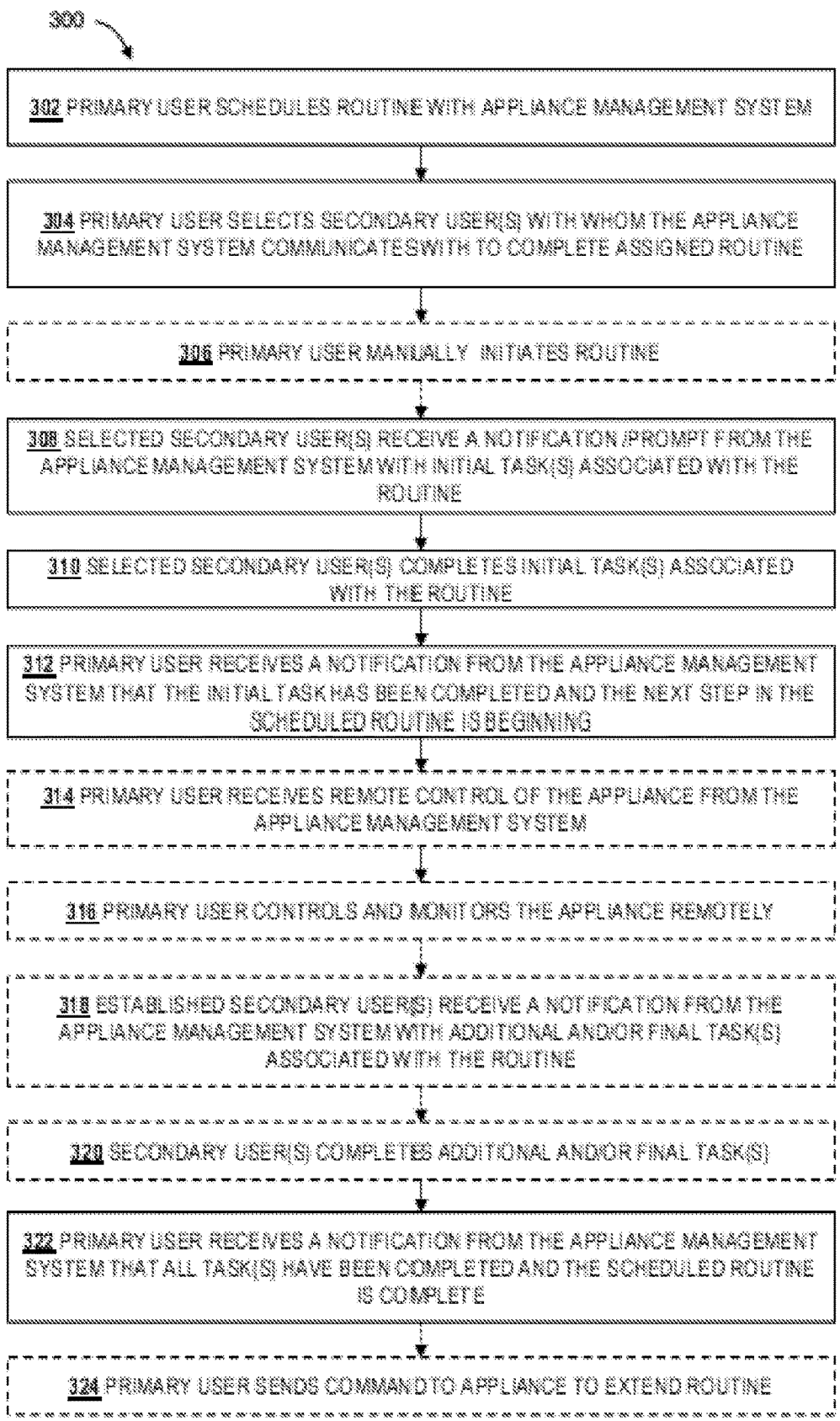
FIG. 6 is a flow chart depicting steps of an illustrative method for using an appliance management system in accordance with aspects of the present disclosure.

This section describes steps of an illustrative method 300 for interacting with an appliance management system; see FIG. 6. Aspects of appliance management systems described above may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of method 300 are described below and depicted in FIG. 6, the steps need not necessarily all be performed, and in some cases may be performed simultaneously or in a different order than the order shown.

Step 302 of method 300 includes creating and scheduling a chore routine to be implemented by the appliance management system. The primary user may create and schedule the chore routine directly on the appliance and/or via one or more connected devices in communication with the appliance such as a mobile digital device operated by the primary user (AKA a primary mobile device). The primary user may use a user interface disposed on the appliance to manually input various parameters of the chore routine. Alternatively, the primary user may utilize a smartphone application downloaded on the primary mobile device to input the various parameters of the chore routine.

Step 304 of method 300 includes establishing and/or selecting secondary user(s) with whom the appliance management system will communicate to perform and/or complete the scheduled routine. In some examples the secondary users' (and in some cases the primary user's) identification and/or contact information is already stored in the system, such that the system need only search through its database. (For example, the information may have been preloaded at an earlier time, e.g., by the primary user.) Alternatively, the primary user may input and/or load a selected secondary user's identification and contact information into the system at step 304 on a one-time-use basis. The primary user may assign selected secondary user(s) with tasks associated with the scheduled chore routine. In some examples, the primary user may select various secondary users and assigns tasks to each one of the secondary users. In some examples, the primary user may assign a selected secondary user with initial task(s) and/or additional task(s) that need to be performed and/or completed before the chore routine can proceed.

Step 306 of method 300 is optional and includes the primary user manually initiating the chore routine on the appliance. In some examples, the primary user may push a button included on the user interface of the appliance to initiate the routine. Alternatively, the primary user may shut a door, hatch, lid, or other component of the appliance to initiate the chore routine. For example, the primary user may manually initiate the routine and then leave the house, such that they are absent during remaining step(s) of method 300.

Step 308 of method 300 included the selected secondary user(s) receiving a notification or alert from the appliance management system with initial task(s) associated with the chore routine.

Step 310 of method 300 includes the selected secondary user performing and/or completing the initial task(s) they have been assigned. In some examples, the selected secondary user after performing and/or completing their assigned initial task may manually confirm the completion of the initial task using the user interface, their mobile device, and/or any other connected device. In some examples, the appliance and/or an associated device is configured to automatically sense data relating to completion of the task (e.g., based on a sensor sensing an object in a particular location, a door having been opened and/or closed, and/or any other suitable data).

Step 312 of method 300 includes the primary user receiving a notification from the system that the initial tasks have been completed by the selected secondary user, and the scheduled chore routine will proceed momentarily. Alternatively, if the initial task(s) have not yet been performed and/or completed by the selected secondary user, the primary user may receive a notification from the system that chore routine has been paused and/or terminated because the initial task(s) were not performed and/or completed in a specified time period.

Step 314 of method 300 is optional and includes the primary user receiving remote control of the appliance. In some examples, step 314 further includes the primary user receiving from the appliance data associated with the chore, such as a time remaining on a timer of the appliance, a temperature of the appliance, a setting and/or phase of operation of the appliance, and/or any other suitable monitoring data. The primary user may thus monitor a status of the scheduled chore routine and/or control the operation of the appliance.

Step 316 or method 300 is optional and includes the primary user monitoring and controlling the appliance remotely. In some examples, the primary user may adjust the various parameters from the chore routine that are implemented by the appliance during the scheduled chore routine, so as to change the operation of the appliance. In some cases, this step includes the primary user sending a notification to the secondary user to take an action at the appliance. For example, the primary user may receive imaging data of clothes inserted into a laundry appliance by the secondary user and see that the secondary user put the wrong clothes or combination of clothes into the laundry appliance, and respond by notifying the secondary user that they should remove some or all of the clothes from the appliance. Additionally, or alternatively, the primary user may adjust an operational parameter of the appliance (e.g., temperature) and/or pause or shut off the appliance in response to received monitoring information.

Step 318 of method 300 is optional and includes the selected secondary user(s) receiving a notification or alert from the appliance management system with additional task(s) associated with the chore routine (e.g., shifting laundry from a washing appliance to a drying appliance).

Step 320 of method 300 includes the selected secondary user performing and/or completing the additional task(s) they have been assigned. In some examples, the selected secondary user after performing and/or completing their assigned additional task(s) may manually confirm the completion of the additional task(s) using the user interface, their mobile device, and/or any other connected device.

Step 322 of method 300 includes the primary user receiving a notification from the system that all task(s) associated with the chore routine have been performed and/or completed by the selected secondary user, and the scheduled chore routine is complete. Alternatively, if all of the task(s) have not yet been performed and/or completed by the selected secondary user, the primary user may receive a notification from the system that the scheduled chore routine has been paused because all the task(s) were not performed and/or completed in a specified time period.

Step 324 of method 300 is optional and includes the primary user sending a command to the appliance to resume or extend the routine. In some examples, the primary user may send an overriding command to the appliance to resume and complete the scheduled chore routine regardless of whether all the task(s) have been performed and/or completed. Alternatively, the primary user may send a command to the appliance to extend the chore routine until the primary user arrives home. In some examples the primary user may send a command to a dryer appliance to extend the drying cycle so as to keep the clothes warm and prevent them from wrinkling. In some examples the primary user may command an oven appliance to change a cooking mode (i.e., baking, broiling, warming, etc.) and/or lower the oven temperature to accomplish a warming mode after the completion of a cooking routine to keep the food warm.

E. Illustrative Method for Managing Performance of Household Task(s)

Figure 7:
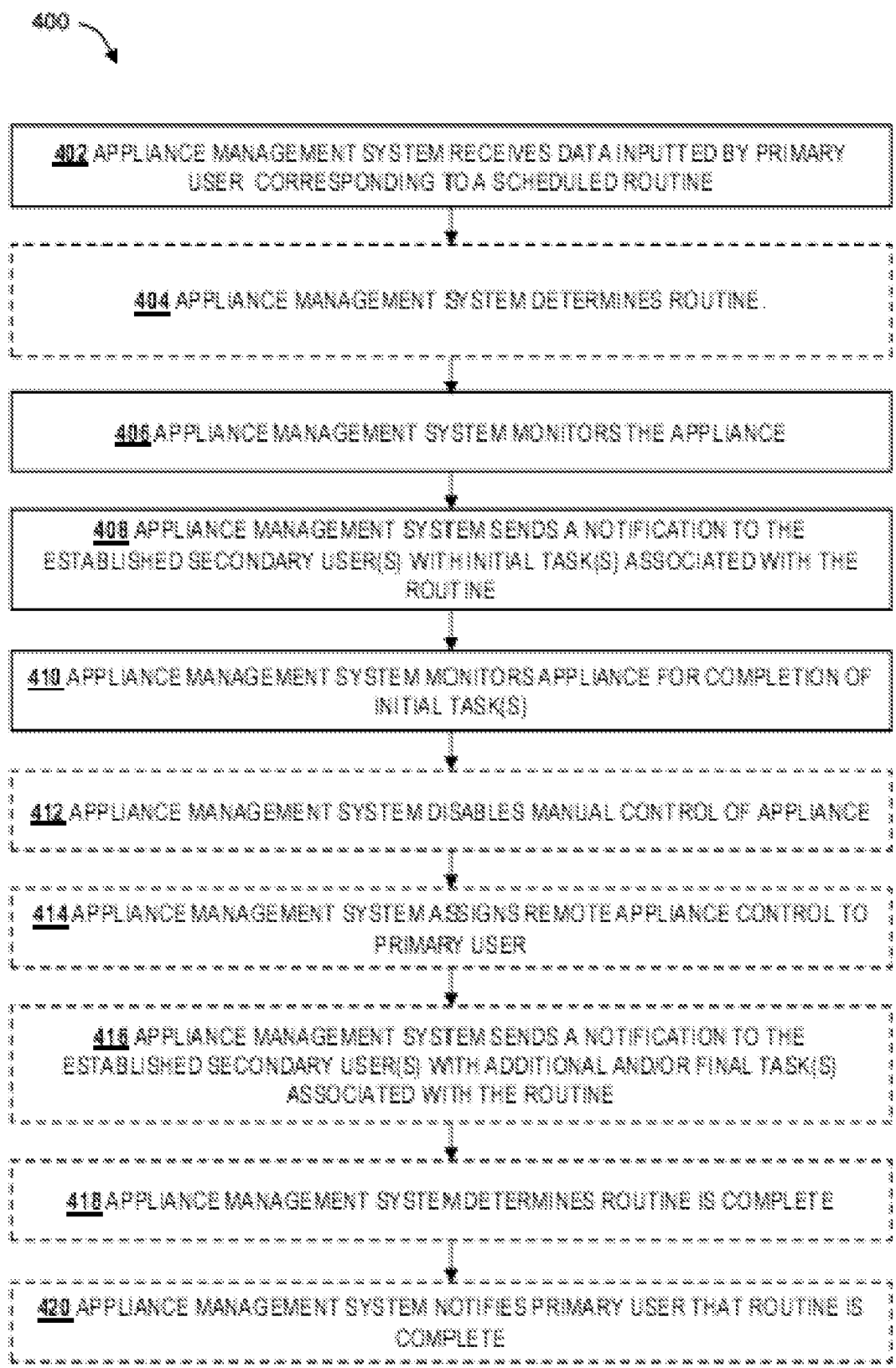
FIG. 7 is a flow chart depicting steps of an illustrative method for managing performance of household tasks in accordance with aspects of the present disclosure.

This section describes steps of an illustrative method 400 for managing performance of household tasks associated with a scheduled chore routine; see FIG. 7. Aspects of appliance management systems described above may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 400 are described below and depicted in FIG. 7, the steps need not necessarily all be performed, and in some cases may be performed simultaneously or in a different order than the order shown.

Step 402 of method 400 includes receiving data corresponding to a scheduled chore routine at a controller of an appliance Step 404 of method 400 is optional and includes determining, by the controller, one or more aspects of the chore routine based on the received data. For example, the received data may include timing information such as an earliest and/or latest allowed start time or finish time for the routine. Based on this information, the controller determines one or more aspects of a routine such as a time at which it will control the appliance to begin an initial step of the routine (e.g., preheating a cooking appliance), a time at which a secondary user should be prompted to perform a task, and/or any other suitable information. In some examples, step 404 is omitted (e.g., because the data received at step 402 expressly includes all applicable aspects of the routine).

Step 406 of method 400 includes receiving signals and/or data from one or more sensors and/or connected devices to monitor the appliance and/or other suitable information and/or activity. In some examples, the controller may receive signals and/or data from one or more sensors configured to collect observational data such as user and/or object presence, current time of day, status of an appliance event, and/or other information. In some examples the controller receives, from an external computing device and/or other suitable processing system coupled to the appliance, signals and/or data indicating current time of day and compares it to the earliest and latest allowed start times. In some examples, the controller receives signals and/or data from one or more sensors configured to monitor the appliance for a completion of an action or operation, such as the completion of a washing cycle for a washing machine appliance.

Step 408 of method 400 includes sending a notification to the identified selected secondary (at-home) user(s) with one or more initial task(s). The notification may present a reminder and/or describe specific actions and/or tasks the secondary user must perform in response to the notification (e.g., at or shortly after the time of receiving the notification) and/or complete before the scheduled chore routine can proceed. In some examples, the controller additionally or alternatively activates and/or manipulates lighting, visual, or audible cues elsewhere in the household through the connected devices (e.g., flashing lights, buzzing alarms, etc.) via a smart home platform. For example, using the family from the example of FIG. 3 and a washer and dryer appliances, the controller may send a notification to Stan that "the washing machine cycle is complete and the clothes are ready to be moved into the dryer."

Step 410 of method 400 includes determining whether the initial task(s) has been completed (e.g., by monitoring the appliance and/or receiving data indicating completion of the task). The controller may monitor progress of initial task(s) assigned to the identified secondary user(s) by receiving signals from one or more monitoring devices such as an imaging device, a weight sensor, a door switch, and/or any other appropriate sensors or components. In some examples, in response to receiving a signal and/or data from the one or more monitoring devices indicating the completion of the initial task(s), the controller transmits a notification to the primary user including information such as, that the initial task(s) has or has not been completed. In some examples, in response to receiving signals and/or data indicating the completion of the initial task(s), the controller transmits a notification to the primary user notifying them that the task has been completed and the scheduled chore program will begin or proceed momentarily. In some examples, the controller is configured to automatically begin a next step in the scheduled chore routine in response to receiving the signal and/or data indicating the completion of the initial task(s). In some examples the controller may transmit a joint notification to the primary and the secondary user, or separate notifications to each user, that the initial task(s) are completed and/or that the next step of the scheduled chore routine has begun.

Additionally or alternatively, if after waiting for a specified period of time, the controller does not receive a signal and/or data indicating the additional task(s)' completion or receives a signal and/or data indicating that the additional task(s) have not been completed, the controller transmits the notification to the selected secondary user(s) again. In examples where the secondary user(s) continually fails to perform and/or complete the assigned task(s), the controller may pause or terminate the scheduled chore routine and send a notification to the primary user that the chore routine has either been paused and/or terminated. In some examples, before pausing or terminating the routine, the controller transmits a notification to the primary user that the task(s) has not been completed and the routine may be paused and/or terminated if the task(s) is not completed. Continuing the example from above, the controller may monitor the washer and dryer for completion of the tasks assigned to Stan such that when Stan opens the washer, the controller senses that the door is open and thus "knows" that the washer is being emptied, and when the dryer door opens and closes the controller senses that the door is closed and thus "knows" that Stan has completed his assigned tasks. Once the controller has recognized that Stan has completed his tasks the controller may automatically control the dryer to start drying the appliance as a next step of the routine.

Step 412 of method 400 is optional and includes disabling manual control of the appliance. In examples where step 412 is performed, it is performed at the same time as and/or shortly after or before step 414, described next.

Step 414 of method 400 is optional and includes enabling the appliance to receive commands from the primary user (e.g., from an electronic device used by the primary user to remotely transmit commands to the appliance). This allows the primary user to remotely control the appliance. In examples wherein step 412 is also performed, step 414 effectively transfers control away from the primary user to the secondary user. The total contribution made by the secondary user to the accomplishment of the chore is thus small. In some examples, step 414 is omitted (e.g., because the appliance and/or the particular operation(s) being performed by the appliance are not suitable for remote control).

Step 416 of method 400 is optional and includes sending a notification to the selected secondary (at-home) user(s) with additional task(s) to be performed and/or completed before the scheduled chore program may proceed. Continuing the example from above, the controller and/or a computer coupled to the appliance (such as a computer of a smart home system) may after a drying cycle of the dryer is finished send a notification to either Stan or Bob (who should be home by now) or both the "drying has completed and laundry needs to be folded."

Step 418 of method 400 is optional and includes determining that the routine is compete (e.g., based on data sensed by a sensor of the appliance and/or other suitable sensor, based on data of a controller of the appliance indicating that operation of the appliance has ended, and/or any other suitable data and/or event).

Step 420 of method 400 is optional and includes notifying the primary user of the completion of the scheduled chore routine.

F. Illustrative Method for Preparing a Meal Using an Oven Management System

Figure 8:
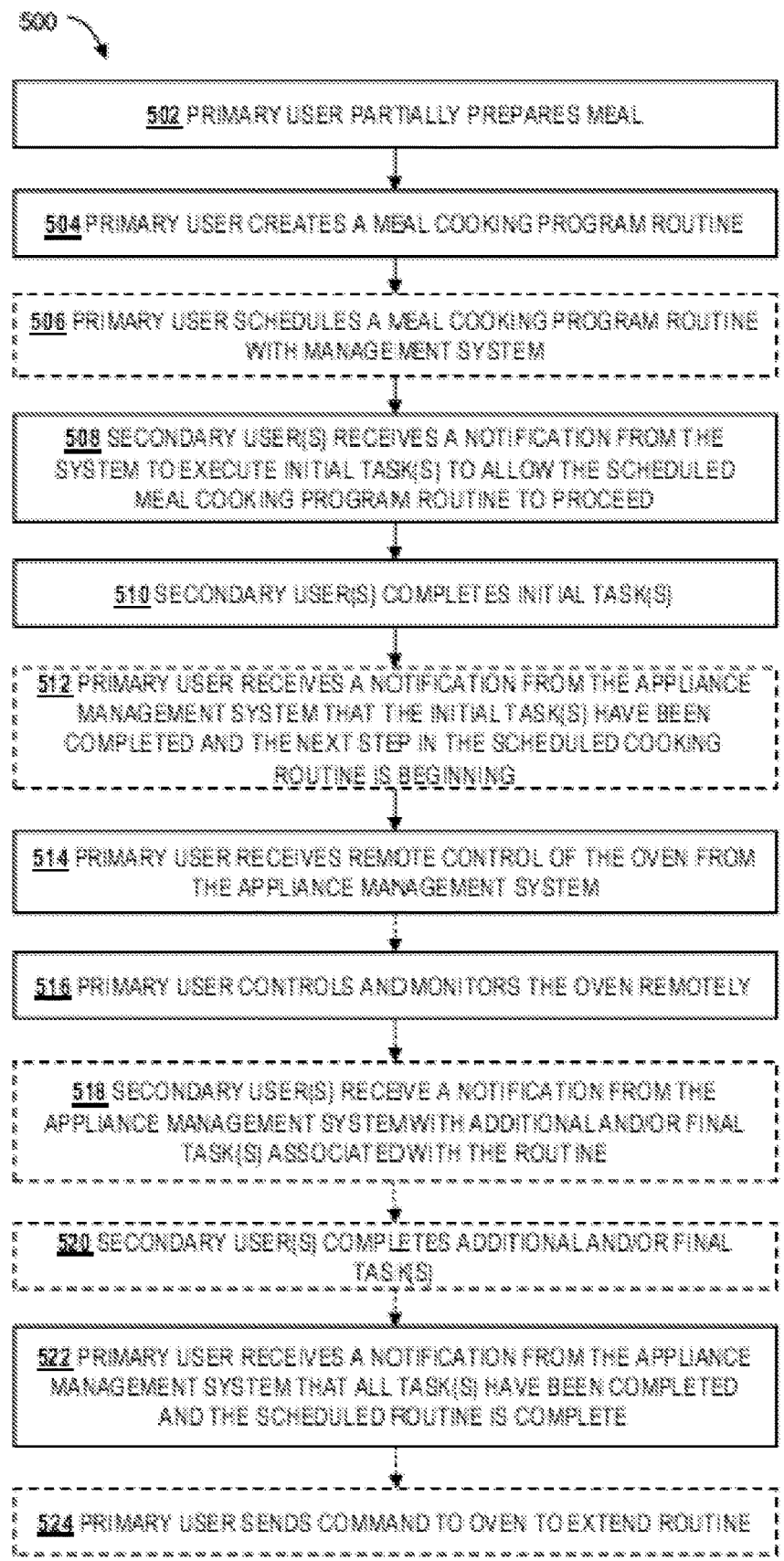
FIG. 8 is a flow chart depicting steps of an illustrative method preparing a meal using an oven management system in accordance with aspects of the present disclosure.

This section describes steps of an illustrative method 500 for preparing a meal using an oven management system; see FIG. 8. Aspects of management systems described above may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 500 are described below and depicted in FIG. 8, the steps need not necessarily all be performed, and in some cases may be performed simultaneously or in a different order than the order shown.

Step 502 of method 500 includes a primary user partially preparing at least part of a meal ahead of time, to be cooked by the oven with the assistance of one or more secondary user(s). The primary user may ahead of time prep (e.g., cutting up any vegetables, marinating meats, assembling the meal, etc.) uncooked components of the meal to be cooked using the management system. If the meal and/or food item(s) in their uncooked form are not stable at room temperature, the primary user may place the partially prepared meal and/or food item(s) in a refrigerator or freezer. For example, in relation to the family from the scenario of FIG. 3, this step is accomplished by Jennifer who assembles components of a lasagna in a dish and places it in a refrigerator uncooked.

Step 504 of method 500 includes the primary user creating a cooking routine to be executed by the management system using the oven. The primary user may create the cooking routine directly on oven using a user interface or via one or more connected devices in communication with the oven such as a primary mobile device. The primary user may use the user interface disposed on the oven to manually input various parameters of the cooking routine. Alternatively, the primary user may utilize a smartphone application downloaded on the primary mobile device to input the various parameters of the cooking routine. The primary user may establish and/or select secondary user(s) with whom the oven management system will communicate with to perform and/or complete the proposed cooking routine. The primary user may assign selected secondary user(s) with tasks associated with the proposed cooking routine. In some examples, the primary user may select various secondary users and assign tasks to each one of the secondary users. In some examples, the primary user may assign a selected secondary user with initial task(s) and/or additional task(s) that need to be performed and/or completed before the cooking routine can proceed. Continuing the example from above, Jennifer creates a cooking routine by specifying the oven to start at 375° F. for 45 min, change to broiling for 15 mins after cheese has been added to the top, finish cooking by 6 PM, with an earliest start time of 3:30 PM, and selects both Stan and Bob as secondary users to be notified Step 506 of method 500 optionally includes the primary user transmitting the cooking routine to the oven. Step 506 is unnecessary in examples in which the primary user creates the routine at step 504 using an interface of the oven, because in that case the routine exists in a memory of the oven controller upon creation. In some examples, however, the primary user creates the routine at step 504 on a device other than the oven (e.g., using a smartphone application). In these examples, step 506 is performed.

Step 508 of method 500 includes the selected secondary user(s) receiving a notification or alert from the appliance management system with initial task(s) associated with the cooking routine. Continuing the example from above, Stan when he gets home receives a notification from the system to "remove the lasagna from the fridge and place it in the oven."

Step 510 of method 500 includes the selected secondary user performing and/or completing the initial task(s) they have been assigned. In some examples, the selected secondary user after performing and/or completing their assigned initial task(s) may manually confirm the completion of the initial task(s) using the user interface, their mobile device, and/or any other connected device. Alternatively, or additionally, the system infers completion of the task based on sensed data, such as data sensed by a door switch indicating that a door has been closed, imaging data indicating the presence of a food item in a particular location (e.g., the oven cooking chamber), and/or any other suitable data. Continuing the example from above, Stan removes the lasagna from the refrigerator, places the lasagna in the oven and closes the door, starting the lasagna cooking program.

Step 512 of method 500 optionally includes the primary user receiving a notification from the system that the initial tasks have been performed and/or completed by the selected secondary user, and the scheduled cooking routine will proceed momentarily. Alternatively, if the initial task(s) have not yet been performed and/or completed by the selected secondary user, the primary user may receive a notification from the system that scheduled cooking routine has been paused and/or terminated because the initial task(s) were not performed and/or completed in a specified time period. Continuing the example from above, Jennifer receives a notification that Stan has put the lasagna in the oven and the lasagna cooking program has begun.

Step 514 of method 300 includes the primary user receiving remote control of the oven, such that the primary user can transmit commands to operate the oven (e.g., via a smartphone application). Automatic operations of the oven (e.g., automatic execution of a cooking program) continue while the primary user has remote control, unless adjusted or stopped by the primary user exercising remote control. In some examples, step 514 further includes the primary user being enabled to receive information from the oven (e.g., automatically and/or in response to a request for an update), such as data sensed by a sensor of the oven, information from a controller of the oven reflecting an operation of the oven, and/or any other suitable data. The primary user may thus monitor a status of the scheduled cooking routine and/or control the operation of the oven. Continuing the example from above, Jennifer receives remote control of the oven at this step.

Step 516 of method 500 includes the primary user controlling and/or monitoring the appliance remotely. In some examples, the primary user may adjust the various parameters an automatic cooking program that are implemented by the appliance during the scheduled cooking routine, so as to change the operation of the oven.

Step 518 of method 500 is optional and includes the selected secondary user(s) receiving a notification or alert from the oven management system with additional task(s) associated with the scheduled cooking routine. Continuing the example from above, at 5:45 PM Stan and Bob (who is now home) each receive a notification to "open the oven and add cheese to the top of the lasagna."

Step 520 of method 500 includes the selected secondary user performing and/or completing the additional task(s) they have been assigned. In some examples, the selected secondary user after performing and/or completing their assigned additional task(s) may manually confirm the completion of the additional task(s) using the user interface, their mobile device, and/or any other connected device. Continuing the example from above, Stan opens the oven and adds the cheese to the top of the lasagna and closes the oven door. In response to sensing the door closing (and/or receiving input from Stan indicating that he has closed the door), a controller of the oven automatically switches the oven to broiling mode.

Step 522 of method 500 includes the primary user receiving a notification from the system that all task(s) associated with the chore routine have been performed and/or completed by the selected secondary user, and/or the scheduled chore routine is complete. Alternatively, if not all of the task(s) have yet been performed and/or completed by the selected secondary user, the primary user may receive a notification from the system that the scheduled chore routine has been paused because all the task(s) were not performed and/or completed in a specified time period. Continuing the example from above, Jennifer is notified that the cheese has been added to the top of the lasagna and the oven has switched to broiling.

Step 524 of method 500 is optional and includes the primary user sending a command to the oven to resume or extend the cooking routine. In some examples, the primary user may send an overriding command to the oven to resume and complete the scheduled cooking routine regardless of whether all the task(s) have been performed and/or completed. Alternatively, the primary user may also send a command to the oven to extend the cooking routine until the primary user arrives home. In some examples the primary user may command the oven to change a cooking mode (i.e., baking, broiling, warming, etc.) and/or lower the oven temperature to accomplish a warming mode after the completion of a cooking routine to keep the food warm. Continuing the example from above, Jennifer is running later than expected and won't be home for an additional 30 minutes, so she remotely sends a command to the oven to at 6 PM switch from broiling to warming (rather than switching from broiling to off, as originally scheduled) to keep the lasagna warm.

G. Illustrative Method for Creating a Cooking Routine

Figure 9:
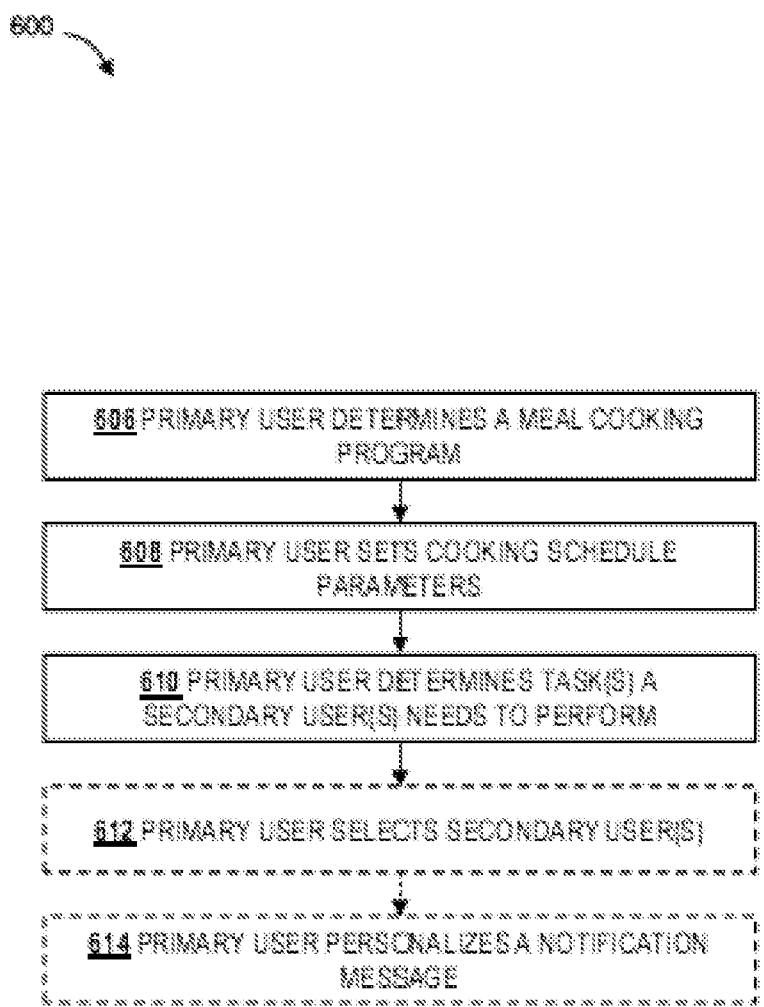
FIG. 9 is a flow chart depicting steps of an illustrative method for creating a cooking routine using an oven management system in accordance with aspects of the present disclosure.

This section describes steps of an illustrative method 600 for creating a cooking routine; see FIG. 9. Aspects of management systems described above may be utilized in the method steps described below. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. Although various steps of method 600 are described below and depicted in FIG. 9, the steps need not necessarily all be performed, and in some cases may be performed simultaneously or in a different order than the order shown.

Step 606 of method 600 includes the primary user determining a meal cooking program to be automatically executed by an oven or other suitable appliance as part of the routine. Determining the cooking program may include selecting one or more programs or components of a program from a list of available cooking programs (e.g., a lasagna program, a casserole program, a steak program, etc.) known by the oven (e.g., stored in a memory of the oven and/or a memory accessible by the oven, e.g., online, in a platform of a smart home system, etc.) and/or creating a new cooking program by manually inputting and setting cooking parameters (i.e., generic cooking mode, temperature, and/or time for each of one or more steps of the created program). The primary user may input information via a user interface of the appliance, via a smartphone application in communication with the appliance, and/or any via any other suitable device.

Step 608 of method 600 includes the primary user setting scheduling parameters of the routine such as a desired starting and/or finishing time for food item(s) of the meal to begin or finish cooking. In some examples, the primary user may specify an acceptable buffer period before or after the desired starting or finishing time during which the cooking routine may begin or finish. In some examples, the primary user may specify an earliest and/or latest allowed start time for the cooking routine.

Step 610 of method 600 includes the primary user determining one or more tasks to be performed by a secondary user (who is present at the appliance) during the cooking routine. The primary user may input information specifying the task, may select the task from a list of possible tasks, or may input information indication that a secondary user should be prompted to perform at ask without actually specifying what the task is. (In the latter case, the secondary user may understand from context what the task is; for example, they may be told ahead of time that they will be expected to put food in an oven to help prepare the meal.) Example tasks include placing the meal and/or food item(s) in the oven after pre-heating, sprinkling cheese on top of the cooking meal and/or food item(s) 15 mins before the end of the routine, removing the meal and/or food item(s) from the oven after routine completion, and/or any other suitable tasks associated with suitable cooking routines.

Step 612 of method 600 optionally includes the primary user selecting which of the one or more secondary user(s) will receive an alert and/or notification from to perform and/or complete the tasks outlined by the primary user. This selection by the primary user determines which of the secondary user(s) the management system will communicates with to perform and/or complete the proposed cooking routine. The primary user may preload the users (i.e., primary and secondary) identification and contact information into the system, such that the system need only search through its database. Alternatively the primary user may input and/or load a selected secondary user's identification and contact information into the system on a one-time-use basis. In some examples, the primary user may select a single secondary user to perform and/or complete all task(s) of the scheduled cooking routine. In some examples, the primary user may select various secondary users and assigns tasks to each one of the secondary users. The primary user may select the accompanying secondary user(s) during the creation of task(s) or after all the necessary tasks have been established. In some examples, step 612 is omitted, and the notification is not secondary-user specific. For example, the notification may be transmitted to all potential secondary users, such that any one or more of them can perform the task. In some examples, the notification comprises a message and/or other suitable indication displayed and/or sounded at the appliance and/or a device of a smart home system, such that any secondary user near enough to see and/or hear the message can perform the task.

Step 614 of method 600 is optional and includes the primary user personalizing a notification message that will be sent to the selected secondary user. The primary user may include more information than what is automatically sent from the system and/or an additional note that does not contain information directly related to the cooking routine, such as a "happy birthday" message, a "do your homework" reminder, or any other message and/or reminder.

H. Illustrative Method for Implementing a Cooking Routine

Figure 10:
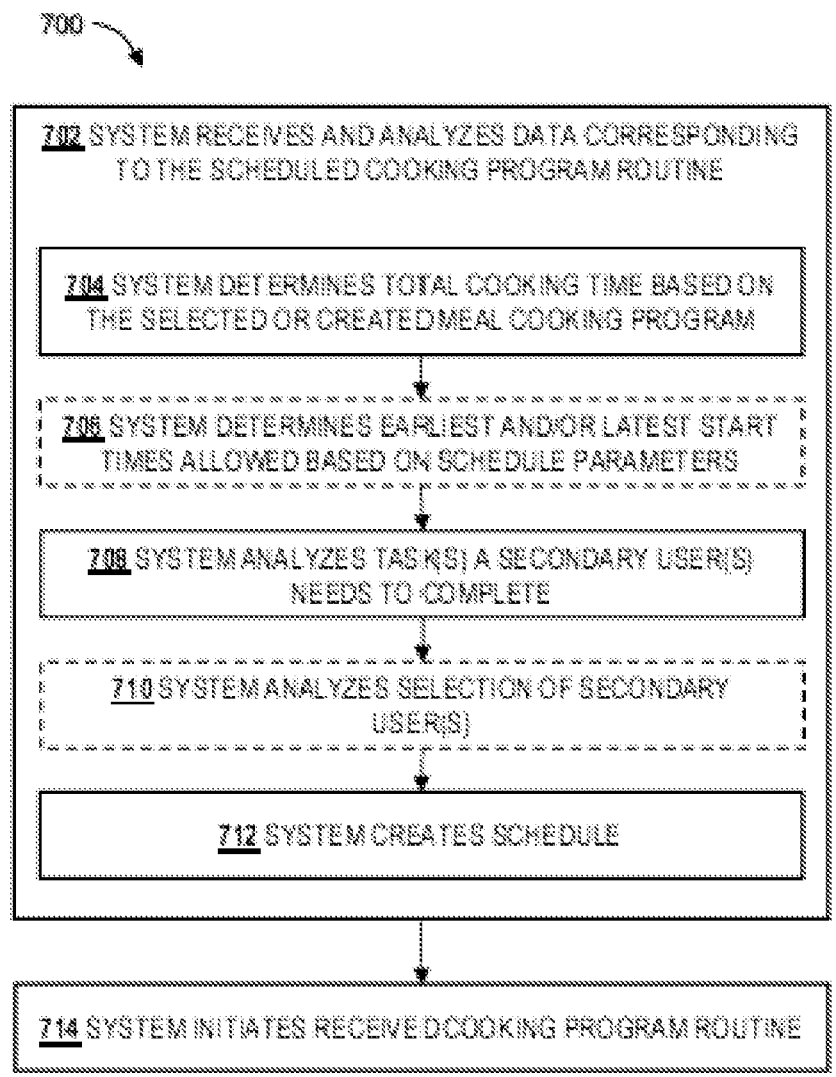
FIG. 10 is a flow chart depicting steps of an illustrative method for automatically implementing a cooking routine in accordance with aspects of the present disclosure.

This section describes steps of an illustrative method 700 for implementing a scheduled cooking routine; see FIG. 10. Aspects of management systems described above may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 700 are described below and depicted in FIG. 10, the steps need not necessarily all be performed, and in some cases may be performed simultaneously or in a different order than the order shown.

Steps of method 700 may be performed by an electronic controller of an appliance, by a computing device coupled to an appliance (e.g., a smartphone or other suitable device, a server of a smart home system including the appliance), and/or any other suitable component(s) of an appliance management system.

Step 702 of method 700 includes receiving data relating to a scheduled cooking routine, e.g., sent from a primary user. A cooking routine may include a variety of parameters selected or determined by the primary user such as a selected existing meal cooking program or a newly created meal cooking program comprising user inputted cooking parameters, scheduling parameters, one or more task(s), and/or a selection of secondary user(s).

Steps 704 through 712 are sub-steps that collectively comprise step 702.

Step 704 of method 700 includes analyzing the meal cooking program created or selected by the primary user and determining a total cook time for the meal (e.g., a total time for which steps of an automated cooking program will operate) and/or an estimated total time of routine completion.

Step 706 of method 700 optionally includes analyzing the scheduling parameters set by the primary user. To determine an earliest and/or latest allowed start time for the cooking routine based on the scheduling parameters received. The system may utilize the estimated total cook time and/or estimated total time of routine completion in addition to the received desired starting and/or finishing time for the meal and/or food items(s) to begin or finish cooking, and an acceptable buffering period inputted by the primary user, to output the earliest and/or latest allowed start time.

Step 708 of method 700 includes analyzing the one or more tasks that will need enlisted help from a selected secondary user(s). In some examples, this step includes processing the received task(s) and ordering them in a proposed timeline to be used to create a tentative schedule for the cooking routine.

Step 710 of method 700 optionally includes analyzing the selection of secondary user(s) to, e.g., determine an appropriate method of contacting the selected user(s). For example, this step may include identifying a phone number, user account name, email address, and/or other suitable information to be used in notifying the secondary user when it is time for them to perform and/or complete their assigned task. In some examples the users (i.e., primary and secondary) identification and contact information may be preloaded into the system, such that the need only search through its database to locate a preferred method of contact. In some examples, a selected secondary user's identification and contact information may be inputted into the on a one-time-use basis (e.g., by a primary user who is creating the routine). In such examples, the selected secondary user's information may be directly transmitted with the scheduled cooking routine, such that the does not have to search for it.

Step 712 of method 700 includes creating a schedule of the cooking routine (e.g., an ordered sequence of events making up the cooking routine). Creating the schedule includes scheduling notifications to be sent to the selected secondary user. The schedule outlines each step of the scheduled cooking routine in accordance with the parameters received from the primary user and/or determined by the system. In some examples, the schedule created at step 712 is a tentative schedule presented to the primary user for approval and/or modification.

Step 714 of method 700 includes initiating the scheduled cooking routine in accordance with the received and analyzed data.

J. Illustrative Data Processing System

Figure 11:
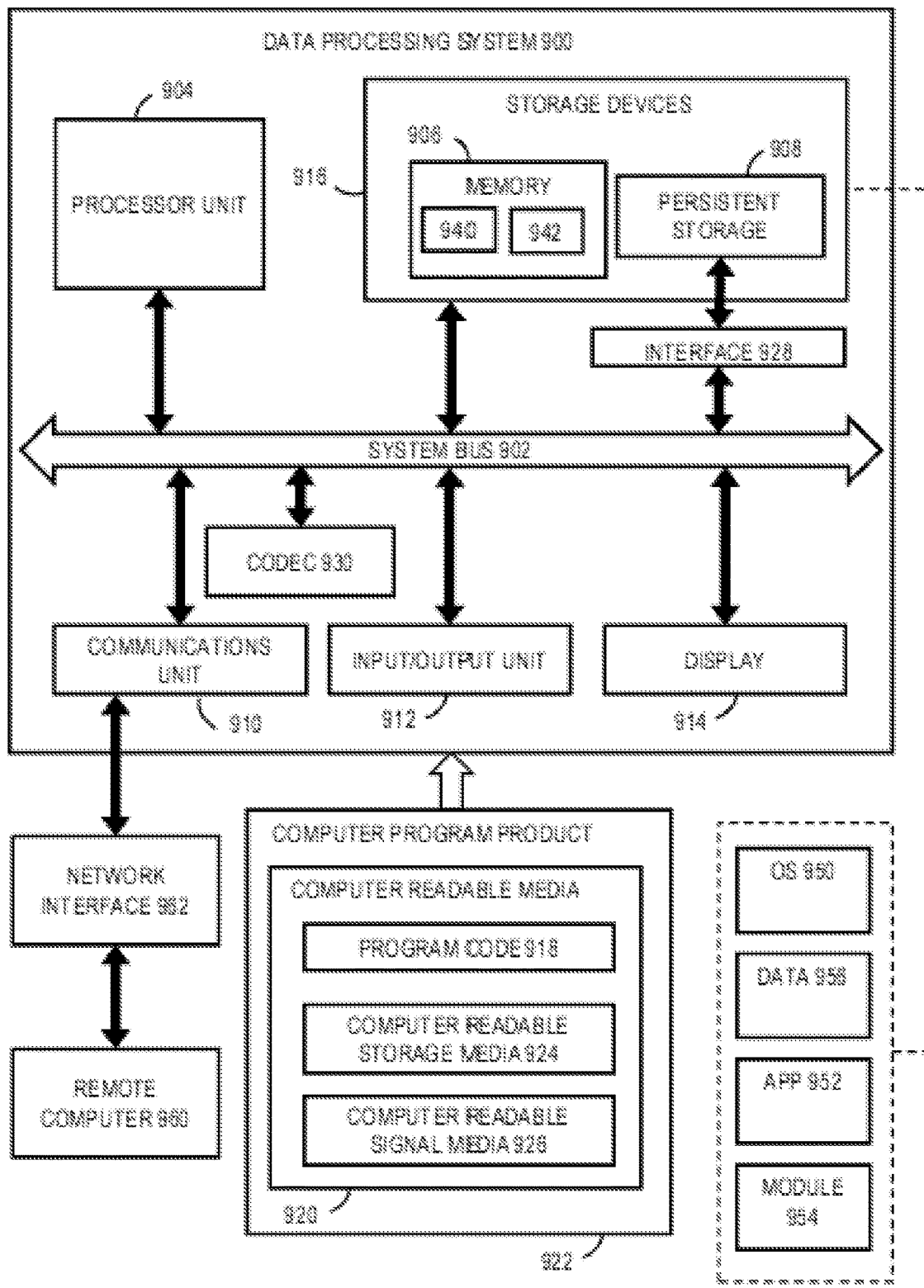
FIG. 11 is a schematic diagram depicting an illustrative data processing system, in accordance with aspects of the present disclosure.

As shown in FIG. 11, this example describes a data processing system 900 (also referred to as a computer, computing system, and/or computer system) in accordance with aspects of the present disclosure. In this example, data processing system 900 is an illustrative data processing system suitable for implementing aspects of the appliance management systems 10. More specifically, in some examples, devices that are embodiments of data processing systems (e.g., smartphones, tablets, personal computers) may be accessed to provide data to the management system, to receive notifications from the management system, or to control, monitor and/or managed an appliance in use by the management system.

In this illustrative example, data processing system 900 includes a system bus 902 (also referred to as communications framework). System bus 902 may provide communications between a processor unit 904 (also referred to as a processor or processors), a memory 906, a persistent storage 908, a communications unit 910, an input/output (I/O) unit 912, a codec 930, and/or a display 914. Memory 906, persistent storage 908, communications unit 910, input/output (I/O) unit 912, display 914, and codec 930 are examples of resources that may be accessible by processor unit 904 via system bus 902.

Processor unit 904 serves to run instructions that may be loaded into memory 906. Processor unit 904 may comprise a number of processors, a multi-processor core, and/or a particular type of processor or processors (e.g., a central processing unit (CPU), graphics processing unit (GPU), etc.), depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device may include any suitable hardware capable of storing information (e.g., digital information), such as data, program code in functional form, and/or other suitable information, either on a temporary basis or a permanent basis.

Storage devices 916 also may be referred to as computer-readable storage devices or computer-readable media. Memory 906 may include a volatile storage memory 940 and a non-volatile memory 942. In some examples, a basic input/output system (BIOS), containing the basic routines to transfer information between elements within the data processing system 900, such as during start-up, may be stored in non-volatile memory 942. Persistent storage 908 may take various forms, depending on the particular implementation.

Persistent storage 908 may contain one or more components or devices. For example, persistent storage 908 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 908 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 908 to system bus 902, a removable or non-removable interface is typically used, such as interface 928.

Input/output (I/O) unit 912 allows for input and output of data with other devices that may be connected to data processing system 900 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 904 through system bus 902 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 900 and to output information from data processing system 900 to an output device. One or more output adapters may be provided for certain output devices (e.g., monitors, speakers, and printers, among others) which require special adapters. Suitable output adapters may include, e.g. video and sound cards that provide a means of connection between the output device and system bus 902. Other devices and/or systems of devices may provide both input and output capabilities, such as remote computer(s) 960. Display 914 may include any suitable human-machine interface or other mechanism configured to display information to a user, e.g., a CRT, LED, or LCD monitor or screen, etc.

Communications unit 910 refers to any suitable hardware and/or software employed to provide for communications with other data processing systems or devices. While communication unit 910 is shown inside data processing system 900, it may in some examples be at least partially external to data processing system 900. Communications unit 910 may include internal and external technologies, e.g., modems (including regular telephone grade modems, cable modems, and DSL modems), ISDN adapters, and/or wired and wireless Ethernet cards, hubs, routers, etc. Data processing system 900 may operate in a networked environment, using logical connections to one or more remote computers 960. A remote computer(s) 960 may include a personal computer (PC), a server, a router, a network PC, a workstation, a microprocessor-based appliance, a peer device, a smart phone, a tablet, another network note, and/or the like. Remote computer(s) 960 typically include many of the elements described relative to data processing system 900. Remote computer(s) 960 may be logically connected to data processing system 900 through a network interface 962 which is connected to data processing system 900 via communications unit 910. Network interface 962 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 930 may include an encoder, a decoder, or both, comprising hardware, software, or a combination of hardware and software. Codec 930 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 930 is depicted as a separate component, codec 930 may be contained or implemented in memory, e.g., non-volatile memory 942.

Non-volatile memory 942 may include read only memory (ROM), programmable ROM (PROM), electrically programmable ROM (EPROM), electrically erasable programmable ROM (EEPROM), flash memory, and/or the like, or any combination of these. Volatile memory 940 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 916, which are in communication with processor unit 904 through system bus 902. In these illustrative examples, the instructions are in a functional form in persistent storage 908. These instructions may be loaded into memory 906 for execution by processor unit 904. Processes of one or more embodiments of the present disclosure may be performed by processor unit 904 using computer-implemented instructions, which may be located in a memory, such as memory 906.

These instructions are referred to as program instructions, program code, computer usable program code, or computer-readable program code executed by a processor in processor unit 904. The program code in the different embodiments may be embodied on different physical or computer-readable storage media, such as memory 906 or persistent storage 908. Program code 918 may be located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may comprise computer-readable storage media 924 or computer-readable signal media 926.

Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

In these examples, computer-readable storage media 924 is a non-transitory, physical or tangible storage device used to store program code 918 rather than a medium that propagates or transmits program code 918. Computer-readable storage media 924 is also referred to as a computer-readable tangible storage device or a computer-readable physical storage device. In other words, computer-readable storage media 924 is media that can be touched by a person.

Alternatively, program code 918 may be transferred to data processing system 900, e.g., remotely over a network, using computer-readable signal media 926. Computer-readable signal media 926 may be, for example, a propagated data signal containing program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer-readable signal media 926 for use within data processing system 900. For instance, program code stored in a computer-readable storage medium in a server data processing system may be downloaded over a network from the server to data processing system 900. The computer providing program code 918 may be a server computer, a client computer, or some other device capable of storing and transmitting program code 918.

In some examples, program code 918 may comprise an operating system (OS) 950. Operating system 950, which may be stored on persistent storage 908, controls and allocates resources of data processing system 900. One or more applications 952 take advantage of the operating system's management of resources via program modules 954, and program data 956 stored on storage devices 916. OS 950 may include any suitable software system configured to manage and expose hardware resources of computer 900 for sharing and use by applications 952. In some examples, OS 950 provides application programming interfaces (APIs) that facilitate connection of different type of hardware and/or provide applications 952 access to hardware and OS services. In some examples, certain applications 952 may provide further services for use by other applications 952, e.g., as is the case with so-called "middleware." Aspects of present disclosure may be implemented with respect to various operating systems or combinations of operating systems.

The different components illustrated for data processing system 900 are not meant to provide architectural limitations to the manner in which different embodiments may be implemented. One or more embodiments of the present disclosure may be implemented in a data processing system that includes fewer components or includes components in addition to and/or in place of those illustrated for computer 900. Other components shown in FIG. 11 can be varied from the examples depicted. Different embodiments may be implemented using any hardware device or system capable of running program code. As one example, data processing system 900 may include organic components integrated with inorganic components and/or may be comprised entirely of organic components (excluding a human being). For example, a storage device may be comprised of an organic semiconductor.

In some examples, processor unit 904 may take the form of a hardware unit having hardware circuits that are specifically manufactured or configured for a particular use, or to produce a particular outcome or progress. This type of hardware may perform operations without needing program code 918 to be loaded into a memory from a storage device to be configured to perform the operations. For example, processor unit 904 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 918) may be implemented as hardware, e.g., by specifying an FPGA configuration using a hardware description language (HDL) and then using a resulting binary file to (re)configure the FPGA.

In another example, data processing system 900 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, system bus 902 may comprise one or more buses, such as a system bus or an input/output bus. Of course, the bus system may be implemented using any suitable type of architecture that provides for a transfer of data between different components or devices attached to the bus system. System bus 902 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in system bus 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

K. Illustrative Distributed Data Processing System

Figure 12:
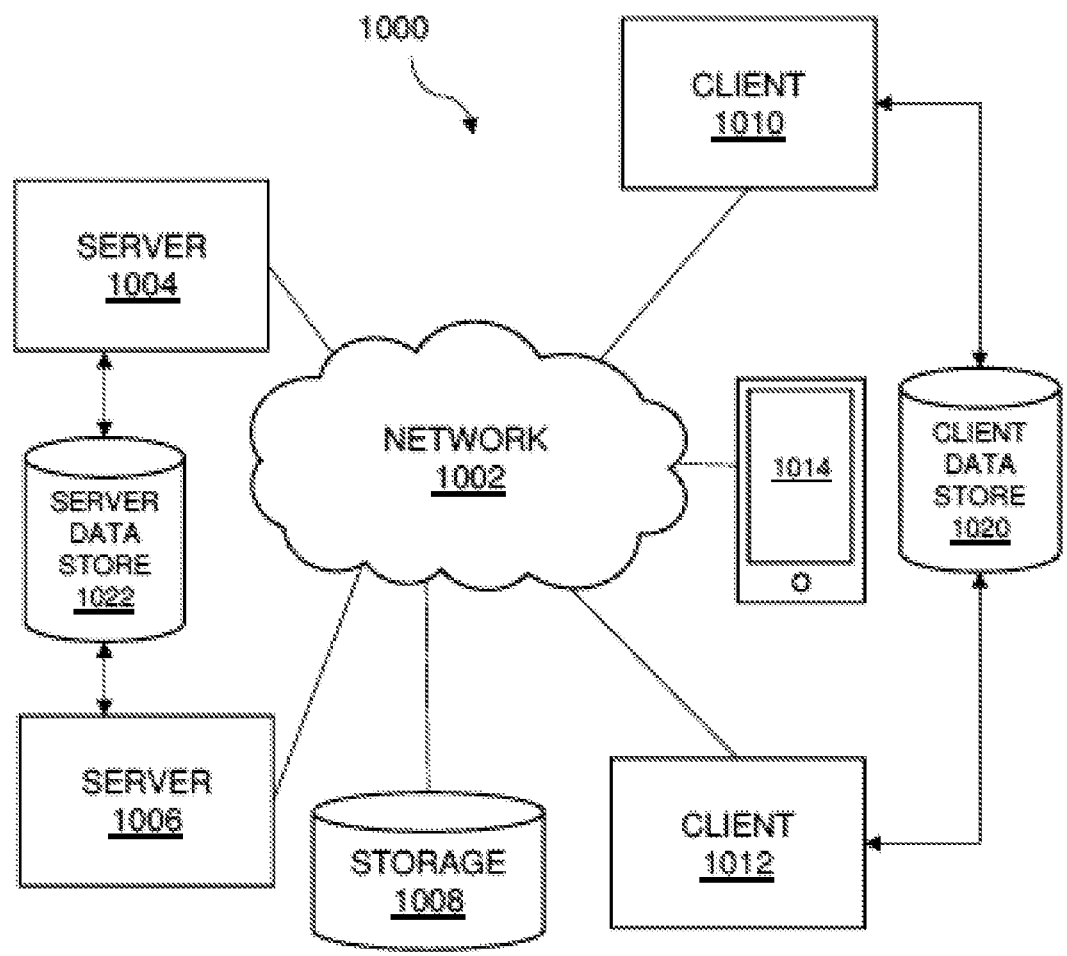
FIG. 12 is a schematic diagram depicting an illustrative distributed data processing system, in accordance with aspects of the present disclosure.

As shown in FIG. 12, this example describes a general network data processing system 1000, interchangeably termed a computer network, a network system, a distributed data processing system, or a distributed network, aspects of which may be included in one or more illustrative embodiments of appliance management system 10. For example, a user's mobile phone, a household's smart home assistants and/or platforms (e.g., a Google home system or Amazon Alexa system) and other smart systems may be in network communication with an appliance of the management system and utilized to retrieve data regarding user presence, a scheduled control routine, and/or other information. In some examples, the user's mobile device may be utilized in a distributed network to execute or transmit commands from a primary user. Additionally, other smart home appliances and/or devices may be in network communication with each other and/or with the appliance in use by the management system, so that the management system may retrieve monitoring data from the other smart appliance or devices such as smart switches, doors, and/or any other systems that may detect a user entering or exiting the household. In some examples, the home network is further configured to connect with external networks to allow a primary user to remotely monitor, control, and/or manage an appliance currently in use by the management system, while being located outside the home.

It should be appreciated that FIG. 12 is provided as an illustration of one implementation and is not intended to imply any limitation with regard to environments in which different embodiments may be implemented. Many modifications to the depicted environment may be made.

Network system 1000 is a network of devices (e.g., computers), each of which may be an example of data processing system 900, and other components. Network data processing system 1000 may include network 1002, which is a medium configured to provide communications links between various devices and computers connected within network data processing system 1000. Network 1002 may include connections such as wired or wireless communication links, fiber optic cables, and/or any other suitable medium for transmitting and/or communicating data between network devices, or any combination thereof.

In the depicted example, a first network device 1004 and a second network device 1006 connect to network 1002, as do one or more computer-readable memories or storage devices 1008. Network devices 1004 and 1006 are each examples of data processing system 900, described above. In the depicted example, devices 1004 and 1006 are shown as server computers, which are in communication with one or more server data store(s) 1022 that may be employed to store information local to server computers 1004 and 1006, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 1010 and 1012 and/or a client smart device 1014, may connect to network 1002. Each of these devices is an example of data processing system 900, described above regarding FIG. 11. Client electronic devices 1010, 1012, and 1014 may include, for example, one or more personal computers, network computers, and/or mobile computing devices such as personal digital assistants (PDAs), smart phones, handheld gaming devices, wearable devices, and/or tablet computers, and the like. In the depicted example, server 1004 provides information, such as boot files, operating system images, and applications to one or more of client electronic devices 1010, 1012, and 1014. Client electronic devices 1010, 1012, and 1014 may be referred to as "clients" in the context of their relationship to a server such as server computer 1004. Client devices may be in communication with one or more client data store(s) 1020, which may be employed to store information local to the clients (e.g., cookie(s) and/or associated contextual information). Network data processing system 1000 may include more or fewer servers and/or clients (or no servers or clients), as well as other devices not shown.

In some examples, first client electric device 1010 may transfer an encoded file to server 1004. Server 1004 can store the file, decode the file, and/or transmit the file to second client electric device 1012. In some examples, first client electric device 1010 may transfer an uncompressed file to server 1004 and server 1004 may compress the file. In some examples, server 1004 may encode text, audio, and/or video information, and transmit the information via network 1002 to one or more clients.

Client smart device 1014 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 1000 may be stored in or on a computer-readable storage medium, such as network-connected storage device 1008 and/or a persistent storage 908 of one of the network computers, as described above, and may be downloaded to a data processing system or other device for use. For example, program code may be stored on a computer-readable storage medium on server computer 1004 and downloaded to client 1010 over network 1002, for use on client 1010. In some examples, client data store 1020 and server data store 1022 reside on one or more storage devices 1008 and/or 908.

Network data processing system 1000 may be implemented as one or more of different types of networks. For example, system 1000 may include an intranet, a local area network (LAN), a wide area network (WAN), or a personal area network (PAN). In some examples, network data processing system 1000 includes the Internet, with network 1002 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 1002 may be referred to as a "cloud." In those examples, each server 1004 may be referred to as a cloud computing node, and client electronic devices may be referred to as cloud consumers, or the like. FIG. 12 is intended as an example, and not as an architectural limitation for any illustrative embodiments.

L. Illustrative Combinations and Additional Examples

This section describes additional aspects and features of appliance management systems, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

- A0. A method for processing a food product, the method comprising:
  - receiving, at processing logic of an appliance disposed at a first location, an indication that a desired action has been taken at the appliance; and
  - in response to receiving the indication:
    - automatically, by the processing logic of the appliance, controlling the appliance to process the food product in accordance with a first stage of a processing program; and
    - automatically disabling a manual control of the appliance, such that the manual control is inoperable to modify the processing of the food product in accordance with the first stage of the processing program.
- A1. The method of paragraph A0, further comprising:
  - while the manual control is in a disabled state:
    - receiving at the appliance a preparation instruction from an offsite computing device of an offsite user, the offsite computing device being disposed at a second location remote from the first location; and
    - processing the food product in accordance with the preparation instruction.
- A1.5 The method of any one of paragraphs A0-A1, further comprising:
  - at a first time prior to receiving the indication, automatically notifying an onsite user that the desired action should be taken.
- A2. The method of paragraph A1.5, further comprising determining the first time based on at least one of a desired earliest starting time, a desired latest ending time, and an anticipated duration of the processing program.
- A3. The method of any one of paragraphs A0-A2, further comprising receiving, at the processing logic of the appliance, user input selecting the processing program from a plurality of available processing programs.
- A4. The method of any one of paragraphs A0-A2, wherein the processing program comprises at least one stage corresponding to automatic operation of the appliance at a predetermined setting for a predetermined length of time, the method further comprising receiving user input identifying the predetermined setting and predetermined length of time.
- A5. The method of any one of paragraphs A0-A4, further comprising:
  - while the manual control is in a disabled state, transmitting data related to the processing of the food product to an offsite computing device of an offsite user, the offsite computing device being disposed at a second location remote from the first location.
- A6. The method of paragraph A5, wherein the data is based on image data corresponding to the food product sensed by an image sensor of the appliance.
- A7. The method of paragraph A5, wherein the data is based on a temperature of the food product sensed by a temperature sensor of the appliance.
- A8. The method of any one of paragraphs A0-A7, wherein a safety shutoff of the appliance is operable while the manual control is in a disabled state.
- A9. The method of any one of paragraphs A1.5-A8, wherein automatically notifying the onsite user of the desired action is performed in response to information indicating that the onsite user is present at the first location.
- A10. The method of paragraph A9, further comprising receiving the information indicating the onsite user is present from a smart home system configured to sense a presence of the onsite user.
- A11. The method of any one of paragraphs A1.5-A8, further comprising receiving a selection of the onsite user from among a plurality of potential onsite users.
- A12. The method of any one of paragraphs A0-A11, wherein receiving the indication that the desired action has been taken includes receiving data from a sensor configured to sense that a door of the appliance has been closed.
- A13. The method of any one of paragraphs A0-A11, wherein receiving the indication that the desired action has been taken includes receiving input via a user interface of the appliance.
- A14. The method of any one of paragraphs A0-A13, further comprising:
  - in response to determining that the first action has not been taken within a predetermined time interval after notifying the onsite user to take the action, transmit to an offsite computing device of an off site user an indication that the first action has not been taken.
- A15. The method of any one of paragraphs A1.5-A14, wherein notifying the onsite user to take the first action includes displaying a message via a personal computing device of the onsite user.
- A16. The method of any one of paragraphs A1.5-A15, wherein notifying the onsite user to take the first action includes activating a display element of a user interface of the appliance.
- A17. The method of any one of paragraphs A1.5-A16, wherein notifying the onsite user to take the first action includes displaying a message via a display device of a smart home system including the appliance.

B0. A system for preparing a food product, the system comprising:
an electronic controller configured to control an appliance to prepare a food product based on a preparation program stored in a memory coupled to the electronic controller, the preparation program including at least a first step associated with a first action to be manually performed at the appliance;
an indicator in communication with the electronic controller and configured to alert an onsite user to manually perform the first action at the appliance;
wherein the electronic controller is configured to:
based on the preparation program, prompt the onsite user via the indicator to manually perform the first action; and
in response to determining that the first action has been performed, control one or more parameters of the appliance to initiate a second step of the preparation program, and transition the appliance to a remotely controllable state in which a user interface of the appliance is prevented from adjusting the one or more parameters of the appliance.
B1. The system of paragraph B0, wherein the electronic controller is further configured to, when the appliance is in the remotely controllable state:
receive, from a user device of an offsite user, a cooking command; and
based on the cooking command, adjust at least a first parameter of the one or more parameters.
B2. The system of paragraph B1, wherein the first parameter is a cooking temperature.
B3. The system of any one of paragraphs B0-B2, wherein the preparation program further includes a third step and the electronic controller is configured to prompt the onsite user via the indicator to manually perform the first action based on determining that the third step has been completed.
B4. The system of paragraph B3, wherein the third step includes heating a cooking space of the appliance to a predetermined temperature.
B5. The system of any one of paragraphs B1-B4, wherein the appliance includes an imaging sensor coupled to the electronic controller and configured to sense image data corresponding to the food product, and wherein the electronic controller is configured to transmit information based on the sensed image data to the user device of the offsite user.
B6. The system of any one of paragraphs B1-B5, wherein the appliance includes at least one sensor configured to sense information corresponding to the food product, and wherein the electronic controller is configured to transmit information based on the sensed information to the user device of the offsite user.
B6. The system of any one of paragraphs B0-B5, wherein the electronic controller is configured to receive time-related input including at least one of a desired earliest cooking start time and a desired latest cooking end time, and to initiate an earliest step of the preparation program at a time determined based on the received time-related input.
B7. The system of any one of paragraphs B0-B6, wherein the electronic controller is further configured to:
in response to determining that the first action has not been performed within a predetermined time interval after prompting the onsite user to manually perform the action, transmit to a user device of an offsite user an indication that the first action has not been performed.
B8. The system of any one of paragraphs B0-B7, wherein the first action includes inserting the food product into a chamber of the appliance and closing a door of the chamber.
B9. The system of any one of paragraphs B0-B8, wherein the electronic controller is configured to determine that the first action has been performed based on a information sensed by a sensor configured to sense that a door of the appliance has been closed.
B10. The system of any one of paragraphs B0-B8, wherein the electronic controller is configured to determine that the first action has been performed based on input received via the user interface of the appliance.
B11. The system of any one of paragraphs B0-B8, wherein the electronic controller is configured to determine that the first action has been performed based on information received from a mobile digital device operated by the onsite user.
B12. The system of any one of paragraphs B0-B11, wherein the appliance includes a safety switch configured to selectively disable power to at least a portion of the appliance, and wherein the safety switch is configured to be operable when the appliance is in the remotely controllable state.
B13. The system of any one of paragraphs B0-B12, wherein the indicator comprises a light source configured to be selectively illuminated by the electronic controller.
B14. The system of any one of paragraphs B0-B13, wherein the indicator comprises a sound-emitting device configured to be controlled by the electronic controller to selectively emit a sound.
B15. The system of any one of paragraphs B0-B14, wherein the indicator comprises a graphical user interface of a mobile digital device of the onsite user, the mobile digital device being in communication with the electronic controller via a network.
B16. The system of any one of paragraphs B0-B15, wherein the electronic controller is further configured to receive information identifying the onsite user from a plurality of potential onsite users.
B17. The system of paragraph B16, wherein the received information identifying the onsite user is received from a user device of the offsite user.
B18. The system of paragraph B16, wherein the electronic controller is in communication with a smart home system of a home via a network, and wherein the received information identifying the onsite user is received from the smart home system based on the smart home system sensing that the onsite user is present at the home.
C0. A method for facilitating remote management of food processing, the method comprising:
at a predetermined time, automatically notifying an onsite user to perform a first manual task at an appliance; and
in response to an indication that the first manual task has been performed:
automatically control the appliance to process a food item; and
automatically transition the appliance to a remotely controllable state wherein the appliance is unresponsive to input via any user interface of the appliance except a safety shutoff.

C1. The method of paragraph C0, wherein automatically controlling the appliance includes automatically controlling the appliance to process the food item for a first time interval at a first appliance setting, the method further comprising:
after the first time interval, notify the onsite user to perform a second manual task at the appliance; and
in response to an indication that the second manual task has been performed, automatically control the appliance to further process the food item;
wherein the appliance remains in the remotely controllable state during the first time interval, while the second manual task is performed, and during the second time interval.

C2. The method of any one of paragraphs C0-C1, further comprising computing the predetermined time based on at least one of a desired earliest processing start time and a desired latest processing end time.

C3. The method of any one of paragraphs C0-C2, further comprising:
while the appliance is in the remotely controllable state, adjusting at least a first processing parameter of the appliance based on an instruction from a mobile device of an offsite user disposed remotely from the appliance.

C4. The method of paragraph C3, wherein the appliance is disposed in a home and the offsite user is disposed away from the home.

C5. The method of any one of paragraphs C0-C4, further comprising transmitting to the mobile device of the offsite user information associated with the processing of the food item by the appliance.

C6. The method of paragraph C5, wherein the information is based on imaging data corresponding to the food item acquired by an imaging sensor of the appliance.

C7. The method of any one of paragraphs C0-C6, wherein notifying the onsite user to perform the first manual task includes displaying a message on a display device of a smart home system including the appliance.

C8. The method of any one of paragraphs C0-C7, wherein notifying the onsite user to perform the first manual task includes displaying a message on a mobile device of the onsite user.

C9. The method of paragraph C8, wherein displaying the message on the mobile device includes communicating data corresponding to the message to the mobile device via a server of a smart home system including the appliance.

C10. The method of any one of paragraphs C0-C9, wherein the appliance is disposed in a home, the method further comprising determining that the onsite user is present at the home.

C11. The method of paragraph C10, wherein determining that the onsite user is present at the home includes determining that a mobile device of the onsite user is connected to a local network of the home.

D0. A method for remotely managing a task, the method comprising:
notifying a first user of a first instruction to perform a manual task relating to at least a first appliance disposed at a first location;
receiving an indication that the manual task has been performed;
automatically controlling the at least first appliance to perform an operation;
transmitting operation information related to the operation of the at least first appliance to a mobile digital device of a second user, the mobile digital device of the second user being disposed at a second location remote from the first location; and
notifying the first user of a second instruction based at least in part on the operation information.

D1. The method of paragraph D0, wherein notifying the first user of the first instruction includes displaying a message on a mobile digital device of the first user.

D2. The method of any one of paragraphs D0-D1, wherein notifying the first user of the first instruction includes displaying an indication on a user interface disposed on the at least first appliance.

D3. The method of any one of paragraphs D0-D2, further comprising transmitting updated operation information to the mobile digital device of the second user at predetermined intervals.

D4. The method of any one of paragraphs D0-D2, wherein transmitting the operation information includes transmitting the operation information in response to a query received from the mobile digital device of the second user.

D5. The method of any one of paragraphs D0-D4, wherein notifying the first user of the first instruction includes notifying the first user of the first instruction in response to determining that the first user is present at the first location.

D6. The method of paragraph D5, further comprising determining, by a smart home system, that the first user is present at the first location.

D7. The method of any one of paragraphs D0-D6, wherein the at least first appliance includes a laundry washer and a laundry dryer, and the first instruction comprises an instruction to transfer clothing from the laundry washer to the laundry dryer.

D8. The method of any one of paragraphs D0-D7, wherein the second instruction is received from the mobile digital device of the second user.

D9. The method of any one of paragraphs D0-D7, wherein the second instruction is generated automatically by a processor of the appliance.

Advantages, Features, and Benefits

The different embodiments and examples of the appliance management systems described herein provide several advantages over known solutions for accomplishing meal preparation and/or other chores. For example, illustrative embodiments and examples described herein allow automated prompting of secondary (non-primary) users to complete tasks and/or chores normally completed by a primary user.

Additionally, and among other benefits, illustrative embodiments and examples described herein allow an appliance to operate autonomously and to be controlled and/or monitored remotely.

Additionally, and among other benefits, illustrative embodiments and examples described herein allow a primary user to schedule an appliance event to occur while the primary user is away, but have the operating controls of the appliance stay with the primary user, with the secondary user performing only (or nearly only) those task(s) which cannot practically be performed remotely, such as inserting an object into an appliance. This allows the secondary user to help with those task(s) while requiring the secondary user to have little or no knowledge of the overall task being performed. For example, the secondary user does not need to be a competent cook in order to help with meal preparation by performing the task(s) in question. Accordingly, the system allows the secondary user to assist with little or no risk that the secondary user's lack of knowledge or experience will be detrimental to the meal preparation process.

Additionally, and among other benefits, illustrative embodiments and examples described herein allows a system to reassign control of an appliance back to a primary user, after the appliance has already at least partially partaken in autonomous operation.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method for processing a food product, the method comprising:
   receiving, at processing logic of an appliance disposed at a first location, timing data indicating an earliest acceptable start time and a latest acceptable completion time of a program for processing the food product, wherein the program comprises at least a first step, a second step, and a third step, wherein the first step includes a first action to be performed manually at the appliance and the third step includes a second action to be performed manually at the appliance;
   receiving, at the processing logic, information indicating a first onsite user who has been selected to perform the first action and a second onsite user who has been selected to perform the second action;
   determining, by the processing logic, based on the timing data and an expected duration of the program, a first time at which the first step should be initiated, a second time at which the second step should be initiated, and a third time at which the third step should be initiated;
   by the processing logic, in response to sensing that the first time has arrived and that a mobile device of the first onsite user is present in a vicinity of the appliance, sending a first message to the mobile device of the first onsite user instructing the first onsite user to manually perform the first action at the appliance;
   by the processing logic, in response to sensing that the first action has been manually performed at the appliance:
      automatically, by the processing logic of the appliance, controlling the appliance to process the food product in accordance with the second step of the program and disabling a manual control of the appliance, such that the manual control is inoperable to modify the processing of the food product in accordance with the second step of the program;
   in response to sensing that the second step of the program is complete and that a mobile device of the second onsite user is present in the vicinity of the appliance, automatically enabling the manual control and sending a second message to the mobile device of the second onsite user instructing the second onsite user to manually perform the second action at the appliance; and
   in response to sensing that the second action has been manually performed at the appliance, automatically, by the processing logic, sending a third message to a mobile device of an offsite user informing the offsite user that the second action has been performed, wherein the offsite user and the mobile device of the offsite user are disposed at a second location remote from the first location.

2. The method of claim 1, further comprising:
while the processing logic is controlling the appliance to process the food product in accordance with the second step of the program:
   automatically, by the processing logic, controlling one or more sensors of the appliance to sense a temperature of the food product and to capture image data of the food product;
   automatically, by the processing logic, sending the sensed temperature and the captured image data to the mobile device of the offsite user;
   receiving at the processing logic a preparation instruction from the mobile device of the offsite user; and
   modifying the processing of the food product in accordance with the preparation instruction.

3. The method of claim 1,
wherein the timing data and the information indicating the first and second onsite users are received at the processing logic from the mobile device of the offsite user.

4. The method of claim 3, further comprising receiving, at the processing logic, from the mobile device of the offsite user, personalized content to be included in the first message.

5. The method of claim 1, further comprising: in response to sensing that the first action has been manually performed at the appliance, sending a fourth message to the mobile device of the offsite user informing the offsite user that the first action has been performed and the second step of the program is being initiated.

6. The method of claim 1, wherein the appliance comprises a heating element, the method further comprising:
   after sending the third message to the mobile device of the offsite user informing the offsite user that the second action has been performed, receiving at the processing logic from the mobile device of the offsite user a cooking instruction configured to control the heating element to keep the food product warm; and
   automatically, by the processing logic, controlling the heating element in accordance with the cooking instruction.

7. The method of claim 1, wherein a safety shutoff of the appliance is operable while the manual control is in a disabled state.

8. The method of claim 1, wherein sensing that the first action has been manually performed includes sensing, by a sensor of the appliance, that a door of the appliance has been closed within a predetermined time interval after having been opened.

9. A system for preparing a food product, the system comprising:
an electronic controller configured to control an appliance to prepare a food product based on a preparation program stored in a memory coupled to the electronic controller, the preparation program including at least a first step and a second step, wherein the first step is associated with a first action to be manually performed at the appliance;
a sensor disposed in a chamber of the appliance and configured to sense data about the food product as the food product is being prepared by the appliance;
a mobile device of an offsite primary user; and
a mobile device of a secondary user;
wherein the electronic controller is configured to:
receive, from the mobile device of the offsite primary user, timing data indicating an earliest acceptable start time and latest acceptable end time for the food product to be prepared based on the preparation program;
based on the received timing data, determine a first time at which the first step should be initiated and a second time at which the second step should be initiated;
in response to sensing that the first time has arrived and that the mobile device of the secondary user is present in a vicinity of the appliance, prompt the secondary user via the mobile device of the secondary user to manually perform the first action;
determine whether the first action has been performed; and:
in response to determining that the first action has not been performed:
notify the offsite primary user via the mobile device of the offsite primary user that the first action has not been performed; or
in response to determining that the first action has been performed:
control one or more parameters of the appliance to initiate the second step of the preparation program at the second time;
transition the appliance to a remotely controllable state in which a user interface of the appliance is prevented from adjusting the one or more parameters of the appliance except to turn off one or more operating elements of the appliance;
while the appliance is in the remotely controllable state transmit data sensed by the sensor disposed in the chamber of the appliance to the mobile device of the offsite primary user, receive a cooking command from the mobile device of the offsite primary user, and based on the cooking command, adjust at least a first parameter of the one or more parameters.

10. The system of claim 9, wherein the preparation program further includes a third step to be performed prior to the first action, and the electronic controller is configured to prompt the secondary user via the mobile device of the secondary user to manually perform the first action based on determining that the third step has been completed.

11. The system of claim 9, wherein the electronic controller is configured to receive, along with the timing data, information identifying the secondary user selected to perform the first action.

12. The system of claim 9, wherein the electronic controller is configured to determine whether the first action has been performed by determining whether a door of the chamber of the appliance has been opened and then closed within a predetermined interval of time.

13. The system of claim 9, wherein in response to determining that the first action has not been performed, the electronic controller is further configured to:
at regular intervals, prompt the secondary user, via the mobile device of the secondary user, to perform the first action;
monitor a current time to determine whether, based on the preparation program and the current time, the preparation program can be completed by the latest acceptable end time; and
in response to determining that the preparation program cannot be completed by the latest acceptable end time, terminate the preparation program and notify the offsite primary user via the mobile device of the offsite primary user that the preparation program is terminated.

14. A method for facilitating remote management of food processing, the method comprising:
receiving, from a mobile device of a primary user, instructions indicating:
a food processing program comprising at least a first automated stage, a first manual task, a second automated stage, and a second manual task; and
a plurality of onsite users who are candidates for performing the first and second manual tasks, the plurality of onsite users including at least a first onsite user and a second onsite user;
at a first predetermined time, automatically controlling an appliance at a first location to process a food item according to the first automated stage, wherein the first location is remote from the primary user;
at a second predetermined time, automatically sensing that the first onsite user is at the first location and automatically sending a first notification to a mobile device of the first onsite user, wherein the first notification comprises an instruction to the first onsite user to perform the first manual task at the appliance;
sensing that the first manual task has been performed; and
in response to sensing that the first manual task has been performed:
automatically transitioning the appliance to a remotely controllable state wherein the appliance is unresponsive to input via any user interface of the appliance except a safety shutoff, and automatically processing the food item according to the second automated stage;
in response to a completion of the second automated stage, automatically transitioning the appliance to a locally controllable state wherein the appliance is responsive to input via one or more user interfaces of the appliance other than the safety shutoff, and automatically sending a second notification to a mobile device of a second onsite user, wherein the second notification comprises an instruction to the second onsite user to perform the second manual task at the appliance.

15. The method of claim 14, further comprising, while the appliance is in the remotely controllable state, transmitting to the mobile device of the primary user information associated with the processing of the food item by the appliance.

16. The method of claim 15, wherein the information is based on imaging data corresponding to the food item acquired by an imaging sensor of the appliance.

17. The method of claim 16, further comprising, while the appliance is in the remotely controllable state and after transmitting the information based on the imaging data to the mobile device of the primary user, receiving from the mobile device of the primary user an instruction configured to automatically control the appliance to reduce a temperature of a heating element.

18. The method of claim 14, wherein the appliance is disposed in a home, and wherein automatically sensing that the first onsite user is at the first location comprises sensing that the mobile device of the first onsite user is connected to a local network of the home.

19. The method of claim 14, further comprising automatically selecting the second onsite user from the plurality of onsite users to receive the second notification based an electronic calendar associated with the second onsite user, wherein the electronic calendar indicates that the second onsite user is expected to be at the location when the second manual task is to be performed.

20. The method of claim 14, wherein transitioning the appliance to the remotely controllable state comprises transmitting an authorization code to the mobile device of the primary user, wherein the authorization code is configured to enable the mobile device of the primary user to control the appliance.

* * * * *